United States Patent
Arntzen et al.

(10) Patent No.: US 6,802,684 B2
(45) Date of Patent: *Oct. 12, 2004

(54) CONTAINER TRANFER TERMINAL SYSTEM AND METHOD

(75) Inventors: John O. Arntzen, Staten Island, NY (US); Richard P. Thorsen, Monroe, NY (US)

(73) Assignee: ACTA Maritime Development Corporation, Staten Island, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 10/236,099

(22) Filed: Sep. 5, 2002

(65) Prior Publication Data

US 2002/0197135 A1 Dec. 26, 2002

Related U.S. Application Data

(63) Continuation of application No. 09/622,623, filed as application No. PCT/US99/05165 on Mar. 8, 1999, now Pat. No. 6,524,050.
(60) Provisional application No. 60/077,443, filed on Mar. 10, 1998.

(51) Int. Cl.[7] .............................................. B65G 67/60
(52) U.S. Cl. ......................... 414/140.3; 114/4; 104/98; 414/140.6; 414/141.3
(58) Field of Search ........................... 414/137.7, 139.8, 414/139.9, 140.1, 142.6, 140.3, 137.1, 137.4, 139.4, 140.6, 141.3; 104/98; 114/4

(56) References Cited

U.S. PATENT DOCUMENTS

| | | | | |
|---|---|---|---|---|
| 3,559,822 A | * | 2/1971 | Lichtenford et al. | ..... 414/140.3 |
| 3,669,288 A | * | 6/1972 | Young | .................. 414/803 |
| 4,335,981 A | * | 6/1982 | Akiyama et al. | ........... 405/221 |
| 4,480,757 A | * | 11/1984 | Oustad | ........................ 212/257 |
| 5,342,739 A | * | 8/1994 | Katou et al. | ................. 430/325 |
| 5,570,986 A | * | 11/1996 | Hasegawa et al. | ....... 414/140.3 |
| 5,876,172 A | * | 3/1999 | Di Rosa | .................. 414/139.9 |
| 6,124,932 A | * | 9/2000 | Tax et al. | .................... 356/614 |
| 6,234,714 B1 | * | 5/2001 | Chattey | ......................... 405/8 |
| 2002/0092820 A1 | * | 7/2002 | Chattey | ...................... 212/325 |
| 2002/0129566 A1 | * | 9/2002 | Piccolo et al. | ............... 52/79.1 |

* cited by examiner

Primary Examiner—Janice L. Krizek
(74) Attorney, Agent, or Firm—Amster, Rothstein & Ebenstein LLP

(57) ABSTRACT

A terminal and system for the automatic computerized unloading of containerized cargo from container ships to trucks, railroad cars, other ships and storage. The terminal system is equipped to store or transfer unloaded cargo automatically by using independent container transfer vehicles. The cargo ships are moored between quays of a terminal building constructed in or adjacent to a waterway. Independent container transfer vehicles on an overhead transverse beam system lift a container up and away from a ship transfer to the elevated ground rail system without changing orientation, and then shuttle on elevated ground conveyance rails to other areas of the terminal to distribute the container to the pertinent transportation system (railcar, truck, another ship, or storage). Containers can also be unloaded from trucks and railroad cars and transported to a berthed ship utilizing the same transportation system. Remotely controlled docking modules may be used to guide an incoming ship into the quay and to assist in engaging the ship's hull onto a bow mooring assembly. Side fenders positioned in the quay moor the ship and maintain its position within the dock during cargo transfers. A rapid fueling system refuels the ships. The terminal can be located on land or offshore in any navigable waterway with either an access tunnel or a causeway for truck and rail access from land.

21 Claims, 23 Drawing Sheets

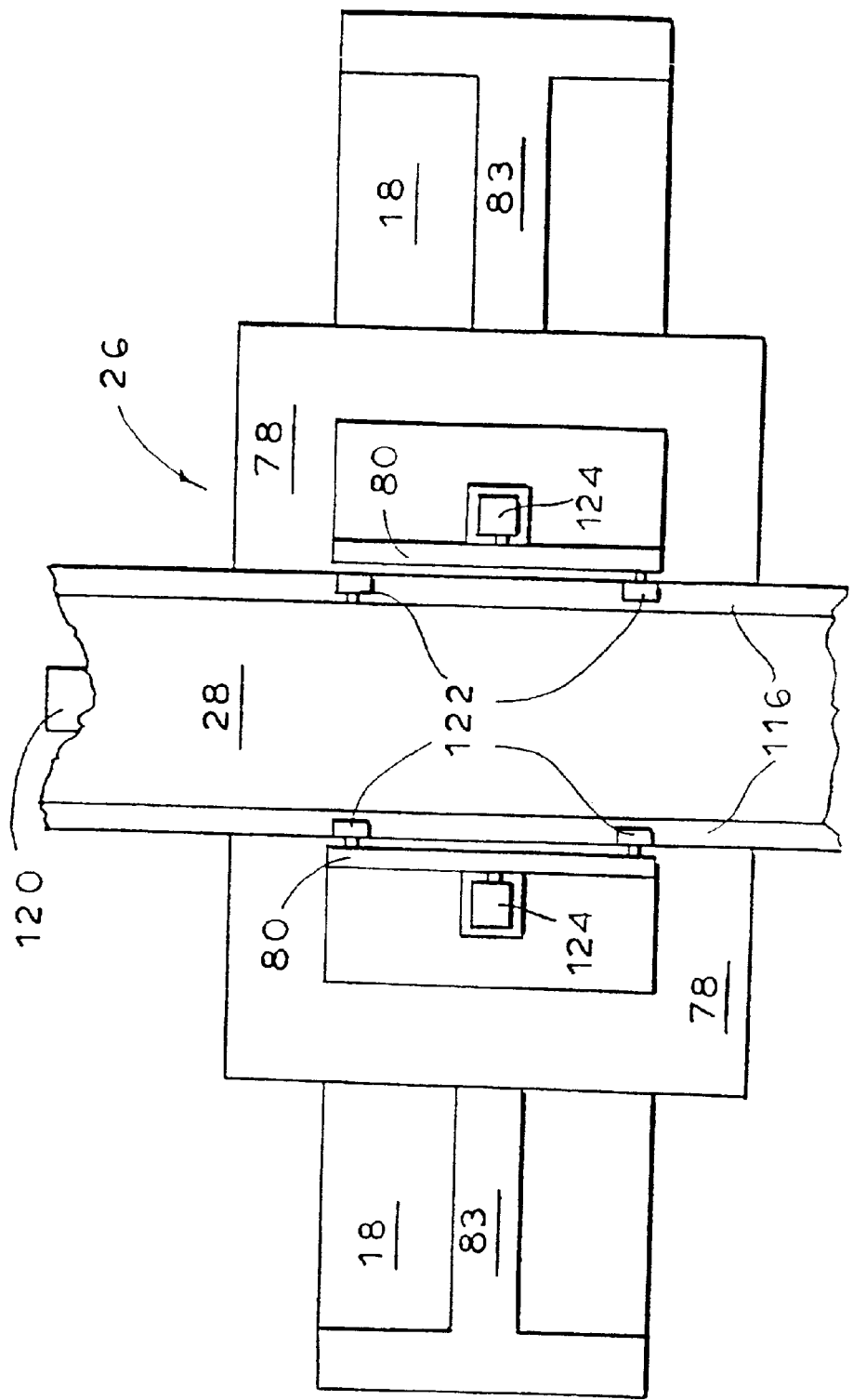

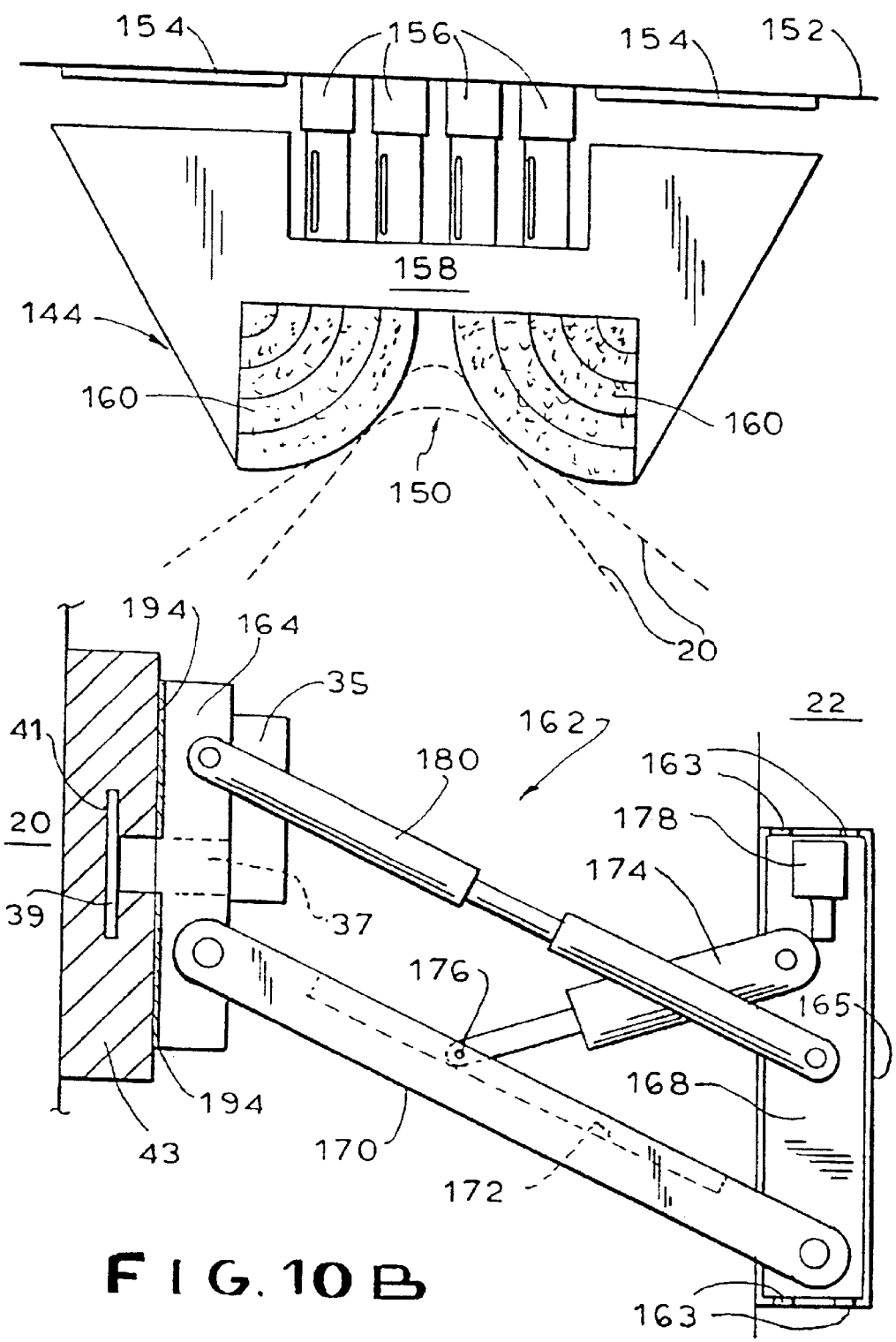

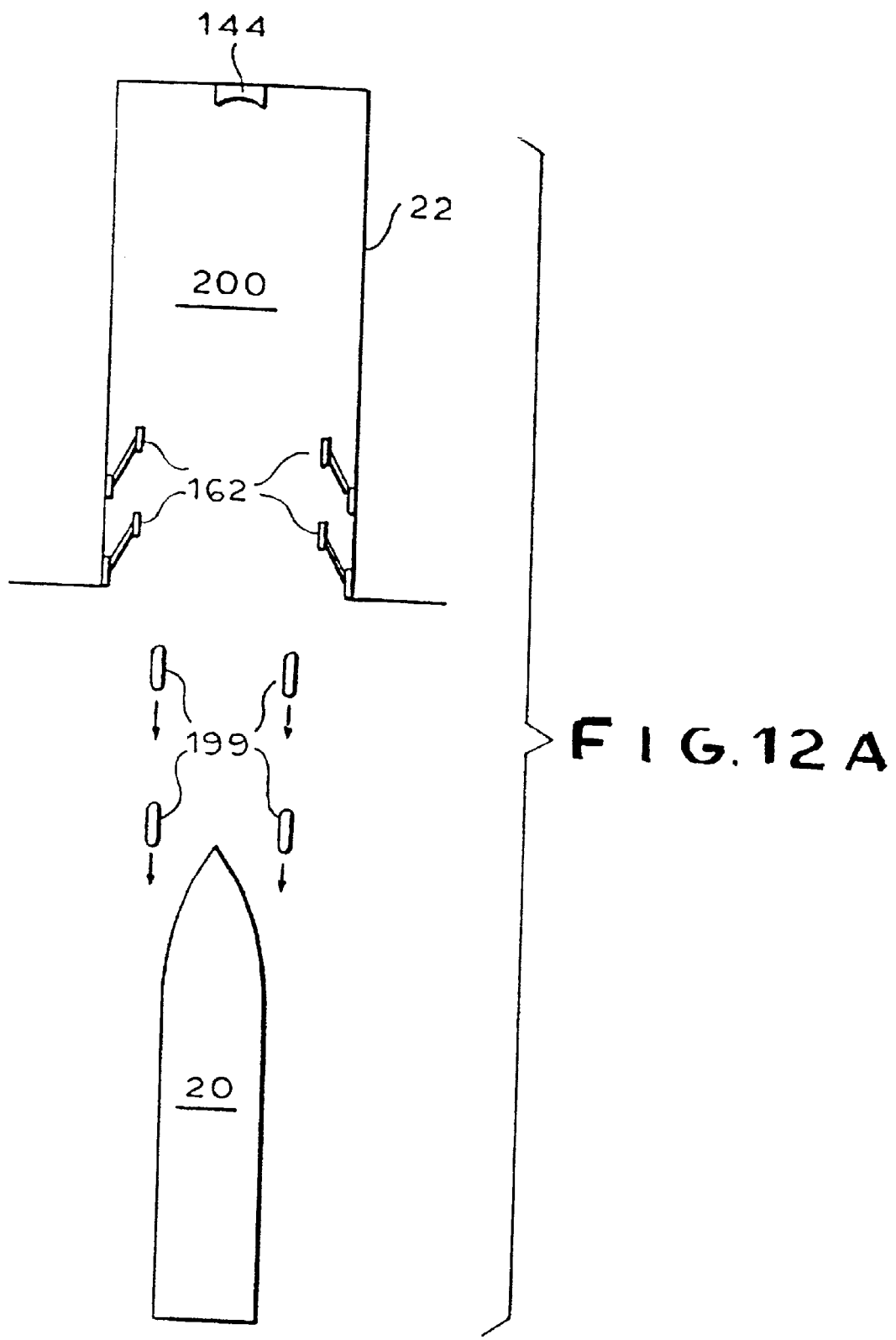

CONTAINER TRANFER TERMINAL SYSTEM AND METHOD

This application is a continuation of U.S. patent application Ser. No. 09/622,623, filed Aug. 16, 2000, now U.S. Pat. No. 6,524,050, which is a national stage application of PCT patent application Serial No. PCT/US99/05165, filed Mar. 8, 1999, which, in turn, claims the benefit of U.S. provisional application Serial No. 60/077,443, filed Mar. 10, 1998.

TECHNICAL FIELD

The present invention relates to a terminal and system for the automatic computerized transfer, e.g., loading and unloading, of containerized cargo between a container ship and trucks, railroad cars, other ships and/or storage.

BACKGROUND ART

The related art of interest describe various means for unloading ship cargo on land or offshore. However, presently, the art neither teaches nor suggests the present invention of utilizing an automated transfer system which does not require gantries for loading and removing cargo from ships.

The related art will be discussed in the order of perceived relevance to the present invention.

U.S. Pat. No. 4,973,219 issued on Nov. 27, 1990, to Laurence R. Brickner et al. ("the '219 Patent") describes a computerized grid rail (GRAIL) container transport and storage system. An integrated container handling system is designed to move containers from a cargo vessel to appropriate storage facilities located proximal to a vessel docking area. The handling system collects containers from a vessel and maneuvers them via a master computerized control system to storage within a dockside facility. The '219 Patent is distinguished by its requirement for a buffer apparatus which includes a gantry type shore crane to unload the containers onto an upper raised platform and a lower raised platform in the buffer for loading containers. The present invention omits the buffer structure and does not require gantry cranes to load and unload the ship's cargo.

U.S. Pat. No. 5,154,561 issued on Oct. 13, 1992, to Donald E. Lee ("the '561 Patent") describes an automated all-weather offshore cargo transfer terminal system. Four Delong B barges (150 ft.×60 ft.×10 ft.) are arranged in parallel pairs and connected by an overhead transverse frame structure (300 ft.×100 ft.) to form an H-shaped terminal in an offshore site. Larger vessels unload on the outside of the barges with smaller ships unloading inside the terminal. Several ship berthing modules under automatic control are required for maintaining the stability of the ships while moored in open water. These flat rectangular modules or fenders are either 16 ft. long and 15 ft. high or 50 ft. long for large ships. The requirements for offshore use with anchorage means and the lack of any mechanical cargo transfer system distinguish the offshore terminal system of the '561 Patent from the present invention.

U.S. Pat. No. 5,505,585 issued on Apr. 9, 1996, to William B. Hubbard ("the '585 Patent") describes a marine/rail interface method for the discharge of import containers from a cargo vessel. A series of rail mounted gantry cranes spanning six rail tracks on a pier remove the import containers from a container ship by individual mobile lifts. Individual rubber tired gantries load or remove the containers from the trucks for temporary storage or which transfer the containers to trucks from the temporary storage for travel on land to an upgraded inland rail area. The trucks return to the crane with export containers. An electronic management system is employed to record the movement of containers by transponders. The '585 Patent is distinguished by its use of multiple cranes, movable gantries, and its reliance on a remote inland storage area.

U.S. Pat. No. 5,511,923 issued on Apr. 30, 1996, to Paul D. Dunstan ("the '923 Patent") describes a container terminal apparatus and method for handling loaded and empty ocean-going containers. The loaded and empty containers are stored in separate remote buildings or banks. Each building has computer automated internal bridge cranes which transport the containers between the buildings and the pier. Each upland and pier bank is provided with external fast transport balconies which enable a container to be moved rapidly lengthwise along the length of the container facility. The '923 Patent is distinguished by its emphasis on transportation and storage in separate facilities.

U.S. Pat. No. 5,618,148 issued on Apr. 8, 1997, to Oyvind T. Iversen et al. ("the '148 Patent") describes a method and apparatus for transporting larger units of container cargo from a ship. Heavy duty pallets on transfer trolleys or wagons driven by either electricity or diesel power are utilized to transport 20–25 containers weighing 600–875 tons directly from a vessel on a pair of parallel train tracks to the quay with crossing points for movement to two storage lines. The stacking and unstacking of containers on a pallet are performed by portal or overhead cranes. The '148 Patent is distinguished by its reliance on pallets, transfer trolleys and cranes not utilized in the present invention.

U.S. Pat. No. 4,762,456 issued on Aug. 9, 1988, to Arthur J. Nelson ("the '456 Patent") describes accommodations to exchange containers between vessels on a floating terminal. The transfer of container cargo is performed by floating gantry cranes. The system of the '456 Patent is distinguished, inter alia, by the lack of an intermodal transportation interface.

U.S. Pat. No. 3,807,582 issued on Apr. 30, 1974, to Leif P. R. Anderson ("the '582 Patent") describes a loading and unloading device for ship containers. The main thrust of the '582 Patent is to move containers from a ship and within a terminal without the use of hoist winches, cables and associated machinery. Containers are lifted up from inside the ship with hydraulic rams. An overhead mounted carriage accepts a group of four containers and moves the group onto a conveyor within the crane. The containers slide over to an elevator within the gantry. The elevator transfers the containers to a ground level roller type conveyor system that moves the container to a storage facility or to a transfer point within the yard. The system of the '582 Patent is distinguishable by its reliance on a ground level gantry crane and a conveyor system, which apparatus are omitted in the present invention.

U.S. Pat. No. 3,812,987 issued on May 28, 1974, to Minoru Watatani ("the '987 Patent") describes a container crane apparatus with a buffer between the crane and a rear conveyance facility on the crane. The apparatus of the '987 Patent is distinguishable because the present invention has no need for a gantry crane.

U.S. Pat. No. 3,740,957 issued on Jun. 26, 1973, to Robert J. McKenzie ("the '957 Patent") describes an apparatus for stabilizing a barge in a body of water for the unloading of heavy loads directly onto rail tracks. A plurality of pilings and associated mechanical devices keep the barge level. The apparatus of the '957 Patent is distinguishable by its need for a track system on the barge to land.

U.S. Pat. No. 3,139,197 issued on Jun. 30, 1964, to John J. Bylo ("the '197 Patent") describes the loading and unloading of an entire block of cargo from a ship by side mechanisms. The system of the '197 Patent is distinguishable by its requirement for removal of an entire block of cargo at one time.

German Patent No. 26 57 830 issued on Jun. 22, 1978, to Gerhard Mayer et al. ("the '850 Patent") describes a freight container harbor transport system with continuously running conveyors alongside a ship and each other in a cascade pattern. The freight container loading gantries are connected to the gangways of a high-rise warehouse parallel to the quayside and accommodating them to the gangways. The continuously running conveyors are arranged in at least the length of the ship and stepped upward in a cascade pattern. The system of the '850 Patent is distinguishable by its reliance on a continuously running conveyor system and the use of a gantry crane for loading and unloading containers.

DISCLOSURE OF INVENTION

None of the above inventions and patents, taken either singly or in combination, is seen to describe the instant invention as claimed.

Accordingly, it is a principle object of the invention to provide a container ship terminal with storage, truck and rail facilities.

It is another object of the invention to provide a container ship terminal having an overhead transverse beam and elevated ground rail system. The overhead transverse beams are used for loading and unloading of container cargo from ships, and to and from storage, with automated vehicles without changing the orientation of the containers.

It is a further object of the invention to provide a container ship terminal with automated vehicles to transfer container cargo via the elevated ground rail system to and from trucks and railcars.

Still another object of the invention is to provide a container ship terminal which is fully automated and controlled by a central computer system for the transfer of cargo to either ships, storage, truck or railcar.

Yet another object of the invention is to provide a graving dock and container ship support services while berthed in the terminal.

Still another object of the invention is to provide facilities for rapidly refueling ships berthed in the terminal.

It is an object of the invention to provide improved elements and arrangements thereof in a container ship terminal for the purposes described which is dependable and fully effective in accomplishing its intended purposes.

The present invention relates to a terminal and system for the automatic computerized transfer, e.g., loading and unloading, of containerized cargo between container ships, trucks, railroad cars, and storage. The terminal and system of the present invention reduces the amount of time required for a container ship to berth, to bunker (take on fuel), load supplies and to discharge and/or take on cargo. The terminal and system of the present invention is equipped to store or transfer the unloaded cargo automatically by using independent container transfer vehicles. The cargo ships are moored in docks of a terminal building constructed in or adjacent to a waterway. Preferably, each of the docks in the terminal and system of the present invention has the capability of acting as a wet dock, a graving dock and a lock. The terminal may be constructed by utilizing encapsulated dredged material. An overhead transverse beam system permits an individual container transport vehicle to lift a piece of cargo up and away from the ship. The container transport vehicle then distributes the unloaded cargo to the pertinent transportation vehicle or to storage within the terminal.

Thus, as a first aspect of the present invention, a terminal system for unloading containers from and loading containers onto container ships is disclosed, comprising a terminal structure having a right side, a left side and a rear side, and a substantially open front side with at least one quay adapted to form at least one dock, the dock including a wall on at least two sides thereof, a plurality of parallel elevated ground conveyance rails positioned atop at least one of the walls, parallel longitudinal conveyance rails positioned above each of the walls, a plurality of parallel transverse overhead conveyance beams constructed and adapted to be positioned perpendicularly between the parallel longitudinal conveyance rails, and at least one container transport vehicle constructed and adapted to be capable of traveling along the elevated ground conveyance rails and the parallel transverse overhead conveyance beams and adapted to pick up, carry and deposit a container between a container ship berthed in one of the at least one docks and a location other than the container ship.

The terminal system may further comprise a computer control system for controlling the operations of each of the container transport vehicles. When more than one dock is included in the terminal system, interquay transfer beams may be included for conveying container transport vehicles from dock to dock.

In addition, the terminal structure may further comprise a storage and transfer area adjacent to the docks containing railroad tracks and/or a roadway, so that the terminal system can transfer containers between a first ship berthed in a one of the docks, a second ship berthed in a second of the docks, a railroad car on the railroad tracks, a truck on the roadway, and/or a storage area within the storage and transfer area by utilizing the transverse overhead conveyance beams, the elevated ground conveyance rails, and the container transport vehicles under computerized control. Furthermore, the terminal system may comprise a railroad access and a truck access to the terminal structure for connection to the railroad tracks and roadway in the storage and transfer area.

In a second embodiment of the present invention, the railroad access and/or the truck access are connected by a tunnel under water to the terminal structure using container chutes located therein. In a third embodiment, the railroad access and the truck access are connected by a causeway on supports to the terminal structure.

Furthermore, the terminal system may include an enclosed terminal structure to accommodate all-weather, year-round operation, which terminal system further comprises a roof on the terminal structure, means for removing ship stack emissions from within the terminal structure, service portals separate from the cargo handling areas of the terminal which provide access to ships berthed in the docks, bow and side fender mooring devices adaptable to the form of a ship's hull, service harnesses which provide fast shore service connections to ships berthed in the docks, caisson doors attached to at least one of the docks which open and close, and when closed isolate the dock from the adjoining waterway to allow dewatering of the dock for drydocking a ship or to permit water to be pumped into the dock acting as a lock to raise the position of a ship within the dock, and a high flow rate fueling system for a ship berthed in one of the docks comprising storage tanks and means for high-speed pumping of fuel.

As another aspect of the present invention, remotely controlled docking modules are provided for moving ships in or out of the docks.

As an additional aspect of the present invention, a bow mooring assembly for mooring a ship by the bow in a dock of a terminal is disclosed, comprising a horizontal rail in a dock wall, mechanical stop elements mounted to the horizontal rail, an H-shaped frame having a front portion consisting of a pair of separated bumpers for accepting a bow of a ship and a rear portion, wider than the front portion, and a plurality of hydraulic damper devices interconnected between the horizontal rail and the rear portion of the H-shaped frame, and whereby the H-shaped frame is limited in movement by the mechanical stop elements and the front portion of the H-shaped frame can accommodate a plurality of bow shapes.

As a yet further aspect of the present invention, a locking side fender assembly for mooring a ship in a dock of a terminal is disclosed, comprising a slotted mooring fitting mounted to a hull of a ship, a key element adapted to fit into the slotted mooring fitting comprising an oblong element connected to a first end of a shaft and an electric rotary actuator attached to a second end of the shaft, a rectangular fender element having elastomeric pads on a front surface and an aperture for the shaft of the key element, the rectangular fender element further having a top surface connected to a first end of a rotatable extender arm and to a first end of an adjuster arm, a rectangular fender carriage mounted in a dock wall and being connected at a top surface thereof to both the rotatable extender arm at a second end thereof, and the adjuster arm at a second end thereof, an extender ram connected between the top surface of the rectangular fender carriage and the rotatable extender arm, a hydraulic power unit mounted to the rectangular fender carriage and to the extender ram to automatically adjust the fender element to an inclination of the hull surface of a ship with appropriate dampening by positioning the extender ram, and a pair of wheels mounted to the rectangular fender carriage for positioning the rectangular fender carriage within a horizontal groove in the dock wall, and whereby the fender carriage can be locked and unlocked to the slotted mooring fitting by the use of the key element.

As a final aspect of the present invention, a system for rapidly fueling a fuel storage tank of a docked ship in a terminal having quays is presented, comprising a quayside storage tank inside the transfer terminal for storing fuel, a fuel pumping unit connectable to the ship's fuel storage tank, a fuel filtration unit located downstream from the quayside storage tank and connected to the pumping unit, a pumping control unit adapted to control the flow of fuel by the fuel pumping unit, and a vapor evacuation unit connected between the quayside storage tank and the ship's fuel storage tank, whereby rapid and safe fueling of the ship's fuel storage tank can be accomplished.

BRIEF DESCRIPTION OF THE DRAWINGS

The above and related objects, features and advantages of the present invention will be more fully understood by reference to the following detailed description of the presently preferred, albeit illustrative, embodiments of the present invention when taken in conjunction with the accompanying drawing wherein:

FIG. 9A is a schematic top plan view of a container transport vehicle carrying a cargo container on an overhead transverse beam.

FIG. 10A is a schematic top plan view of a ship's bow catcher fender.

FIG. 10B is a schematic top plan view of a fender for a side of a ship or a docking module in a locked position.

FIGS. 12A, 12B, 12C and 12D illustrate the sequence of events that take place to berth and moor a ship using remotely controlled docking modules and fender devices.

Similar reference characters denote corresponding features consistently throughout the attached drawings.

MODES FOR CARRYING OUT THE INVENTION

Figure 1A:
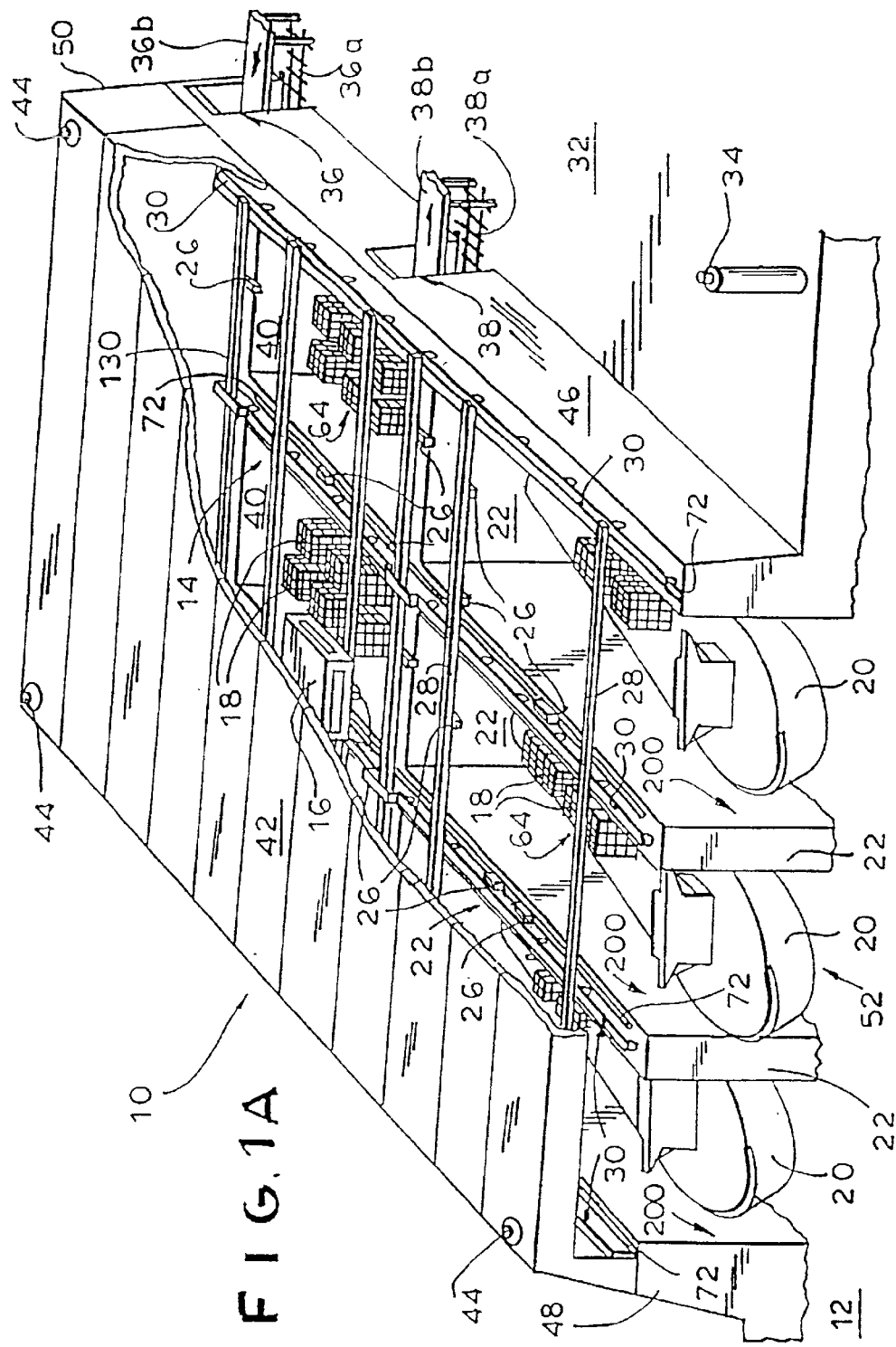
FIG. 1A is a front elevational perspective view, partially broken away, of a first embodiment of a ship terminal of the present invention.

As depicted in the partial breakaway drawing of FIG. 1A, as a first embodiment of a site plan, the present invention provides container ship terminal 10 constructed in or adjacent to waterway 12 which includes automated overhead beam and elevated ground rail transfer system 14 controlled by a central computer system (not shown) housed in control station 16 for loading, storage and unloading of cargo containers 18 from stacks 64 on ships 20.

Figure 2:
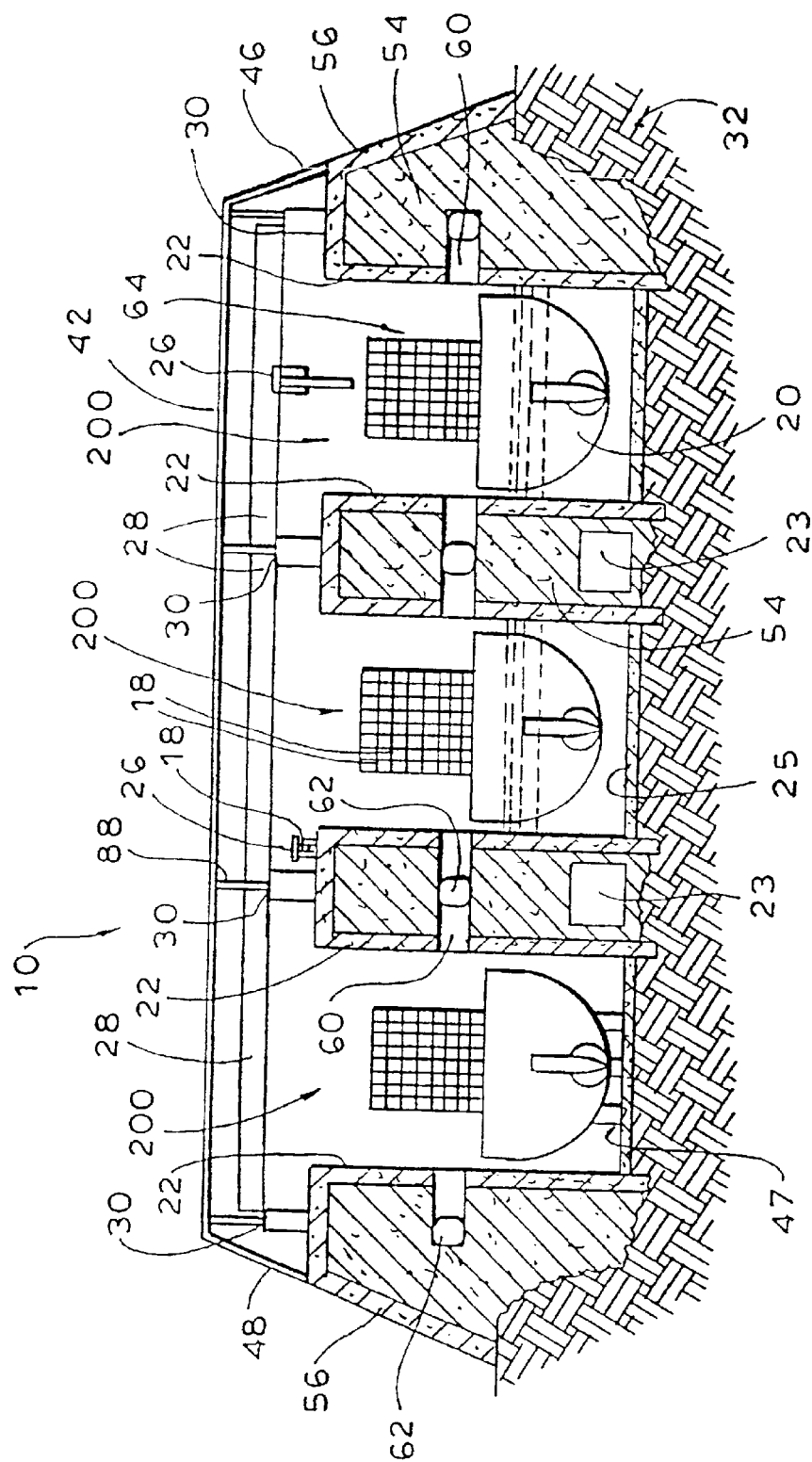
FIG. 2 is a front elevational cross-sectional view of a ship's berthing area taken along the line 2—2 of FIG. 1A and looking in the direction of the arrows.

Ships are shown berthed in an exemplary number of three either wet docks, graving (dry) docks or locks 200 (hereafter all referred to as docks), preferably including caisson doors 24 (not shown in FIG. 1A to show ships 20) which may have a hollow steel structure. Hinged caisson doors 24 (FIG. 3) open outward and close across the entrance of dock 200 with the requisite locking and sealing elements. Conventional support blocks 47 required for dry-docking are shown in dock 200 under left ship 20 in FIG. 2. The required pump rooms 23 for flooding and dewatering dock 200 are preferably included in berms 54 of quays 22 as shown in FIG. 2.

Individual containers 18 are shown being transported by container transport vehicles 26 on automated overhead beam and elevated ground rail transfer system 14. Transfer system 14 comprises a plurality of overhead transverse beam assemblies 28 traveling on a plurality of longitudinal rail assemblies 30. Note that the orientation of individual containers 18 is always maintained in the same direction to reduce the complexities of transfer within transfer system 14, and is a distinct advantage.

Roof 42 can comprise either structural steel, steel strut supported fiberglass or other suitable materials, as one reasonably skilled in the art will recognize.

On land 32, combined beacon light and vessel tracking system 34 may be provided for the guidance of incoming cargo ships 20. Terminal 10 has entrance area 36 and exit area 38 for ingress and egress, respectively, of preferably both railcars and trucks to and from storage and transfer area 40. It should be noted that the entrance 36 and exit 38, respectively, in the FIG. 1A embodiment can be positioned on any land-adjacent side of terminal 10. The elevations of the truck and rail transfer lanes shown in FIG. 1A are limited to the particular site plan selected, and as one reasonably skilled in the art will recognize, the positioning thereof is a design choice to be made at the time the particular terminal is being designed.

Figure 14:
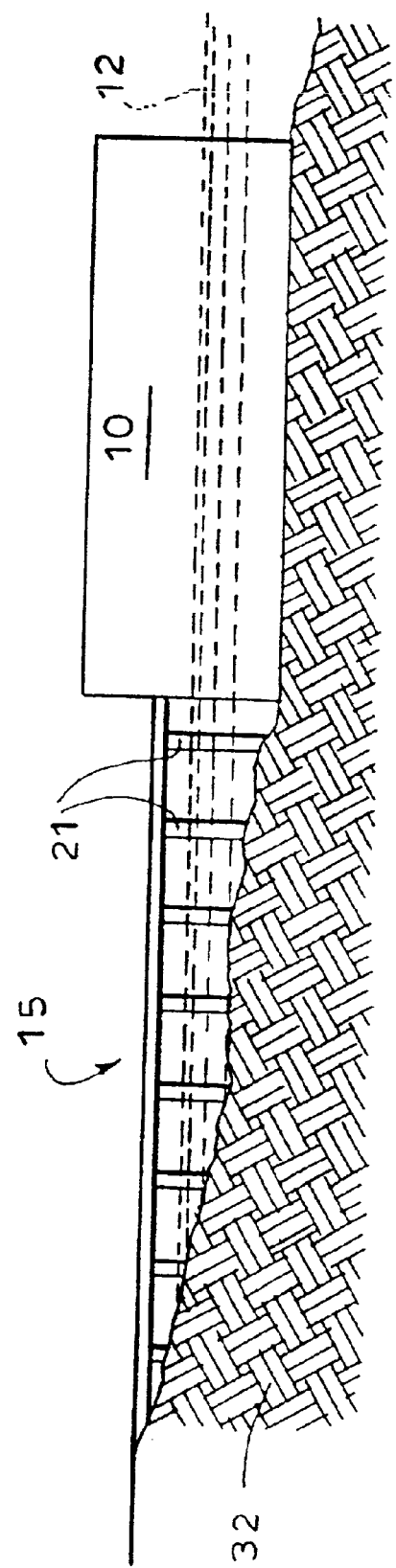
FIG. 14 is a schematic representation of a second embodiment of the present invention in which the terminal and system is located offshore in any navigable waterway such as a bay or harbor with a bridge from the mainland for truck and rail access to the terminal.
Figure 15:
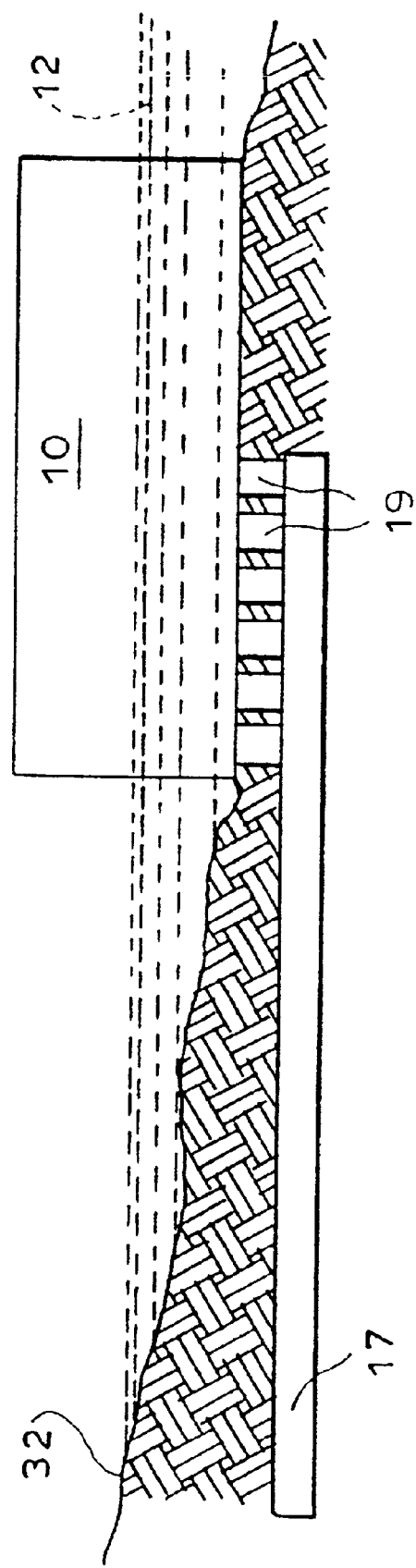
FIG. 15 is a schematic representation of a third embodiment of the present invention in which the terminal and system is located offshore in any navigable waterway such as a bay or harbor with an access tunnel for truck and rail access to the terminal from the mainland.

FIGS. 14 and 15 illustrate alternative embodiments of site plans for terminal 10 dependent on its distance from land 32. In FIG. 14, as a second embodiment, causeway 15 on supports 21 is provided for rail and truck ingress and egress. In FIG. 15, as a third embodiment, rail and truck tunnel 17 is formed from land 32 to the rear end of terminal 10 to connect with a plurality of container chutes 19 for receiving or delivering cargo containers 18.

Thus, terminal 10 is essentially composed of quays 22 and docks 200 to the front and storage and transfer area 40 to the rear, all under one roof 42. The structure of terminal 10 depicted in FIG. 1A comprises planar roof 42, planar sidewall 46, planar left sidewall 48, planar rear sidewall 50, and open front 52 with quays 22 forming an exemplary number of three docks 200. Each dock 200 is preferably formed by quays 22 on three sides, as specifically shown in FIG. 3, which typically are man-made structures. However, as one reasonably skilled in the art will realize, one or more of quays 22 may be formed from naturally-occurring formations, if the particular siting chosen for terminal 10 includes the appropriate naturally-occurring formations.

Optionally, terminal 10 may include corner lights 44 mounted on roof 42. It should be noted that the terminal structure shown in FIG. 1A is exemplary of one of several possible forms, including the type and shape of the roof and sidewalls, the number of docks included therein, and the optional use of encapsulated dredge material for terminal construction. When functioning as a graving dock, caisson doors 24 to dock 200 can be closed and sealed, and dock 200 dewatered. When dewatered, ship 20 will be supported on dock floor 25 with support blocks 47 (shown in FIG. 2) such that repairs, inspections and maintenance can be conducted on the underwater hull of ship 20.

Caisson doors 24 also allow dock 200 to function as a lock, whereby caisson doors 24 are closed and sealed, and water pumped into the dock 200 to raise ship 20 relative to overhead transverse beam assemblies 28. The raising of ship 20 relative to overhead transverse beam assemblies 28 serves to minimize the transfer distance, and thus the transfer time between container transport vehicles 26 on overhead transverse beam assemblies 28 and containers 18 on ship 20. Central computer system in control station 16 controls the transfer of water into and out of dock 200 to optimize cargo movements between container transport vehicle 26 on overhead transverse beam assemblies 28 and ships 20.

FIG. 2 is a partial sectional view of the ship berthing area comprising quays 22 and docks 200 of terminal 10, and illustrates the excavation required to form quays 22 by dredging. Optionally, the material removed during dredging can be utilized to form berms 54 which are contained by concrete walls or casings 56, although, as one reasonably skilled in the art will realize, other types of fill may be used to form berms 54, and other construction techniques may be used to form quays 22. Overhead transverse beam assemblies 28 of automated overhead beam and elevated ground rail transfer system 14 are shown extending between right sidewall 46 and left sidewall 48. Overhead transverse beam assemblies 28 travel on rollers 58 (FIG. 4A) on longitudinal rail assemblies 30 from open front 52 to the rear of dock area 200. It should be noted that transverse beam assemblies 28 are shown incidentally aligned in FIG. 1A, and their exact position over dock area 200 can be controlled by the central computer system to traverse along longitudinal rail assemblies 30 by their individual motorized rollers 58. Service portal areas 60 are located in each berm 54 of each quay 22 with longitudinal access tunnels 62 serving each service portal area 60 and access tunnel 62 shown in enlarged form in FIG. 5. One container transport vehicle 26 is shown in overhead suspension over a stack 64 of containers 18. Another container transport vehicle 26 with container 18 is shown atop one quay 22 on elevated ground conveyance rails 72 (not shown in FIG. 2) for transport longitudinally within terminal 10.

Figure 1B:
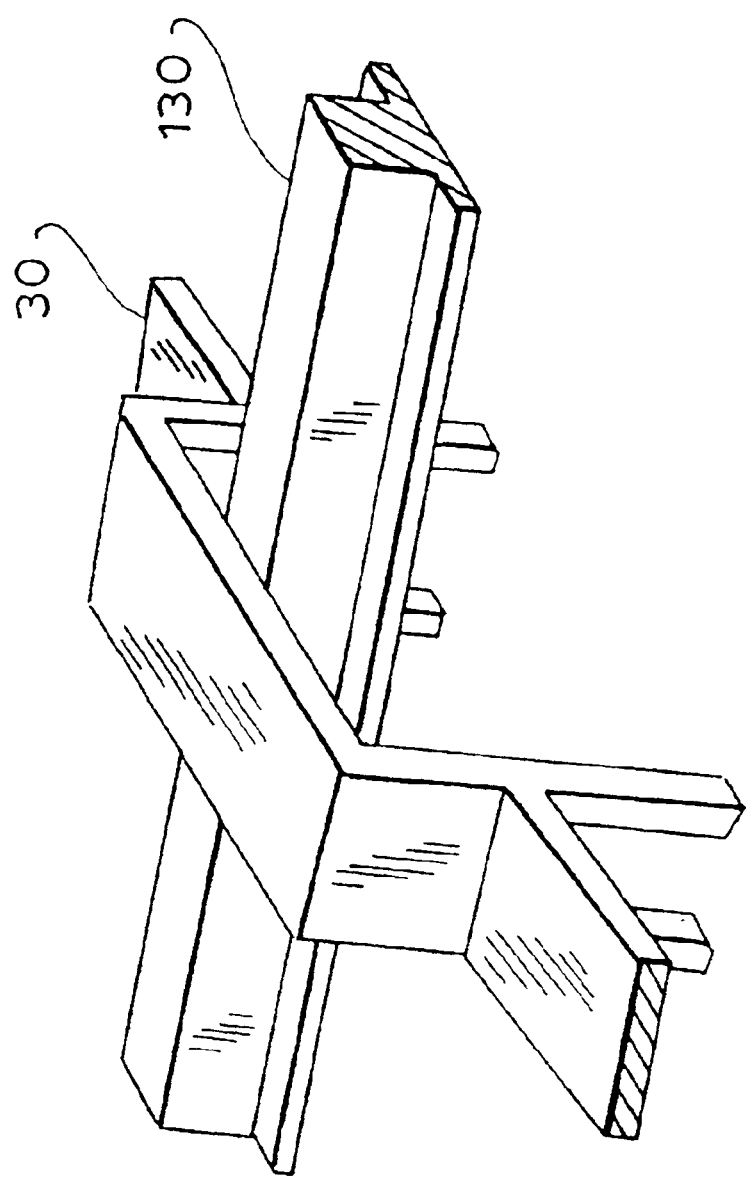
FIG. 1B is an enlarged detailed view of an interquay transfer beam.

Interquay transfer beams 130 are used to convey container transport vehicles 26 between elevated ground conveyance rails 72 (see FIG. 4A) within terminal 10. Similar in form and function to transverse overhead beams 28, they differ only in that they are in a fixed position and span the entire width of terminal 10, and thus must allow container transport vehicles 26 to pass through longitudinal rail assemblies 30 (as shown in additional detail in FIG. 1B). Thus, a container transport vehicle 26 located on any given elevated ground rail 72 on any quay 22 can transfer to another by engaging an interquay transfer beam 130, traversing along the width of terminal 10, and transferring to the desired elevated ground rail 72 destination. Interquay transfer beams 130 also facilitate ship to ship transfer, when shifting containers from a first ship in a first dock to a second ship in a second dock.

The central computer system may create and continuously update a viable loading plan for each ship 20 based upon its trim and stability characteristics as well as the cargo, ballast and fuel conditions thereof. The central computer system is capable of continuously adjusting the loading plan in accordance with input data regarding the timeliness of cargo not yet arrived in terminal 10, and accurately monitors the locations of all incoming and outgoing containers 18 in terminal 10. The central computer system may also program and control the movements of all container transport vehicles 26, and maintains an optimum water level in dock 200 to maintain a predetermined distance between the highest container 18 and overhead beam assemblies 28.

Figure 3:
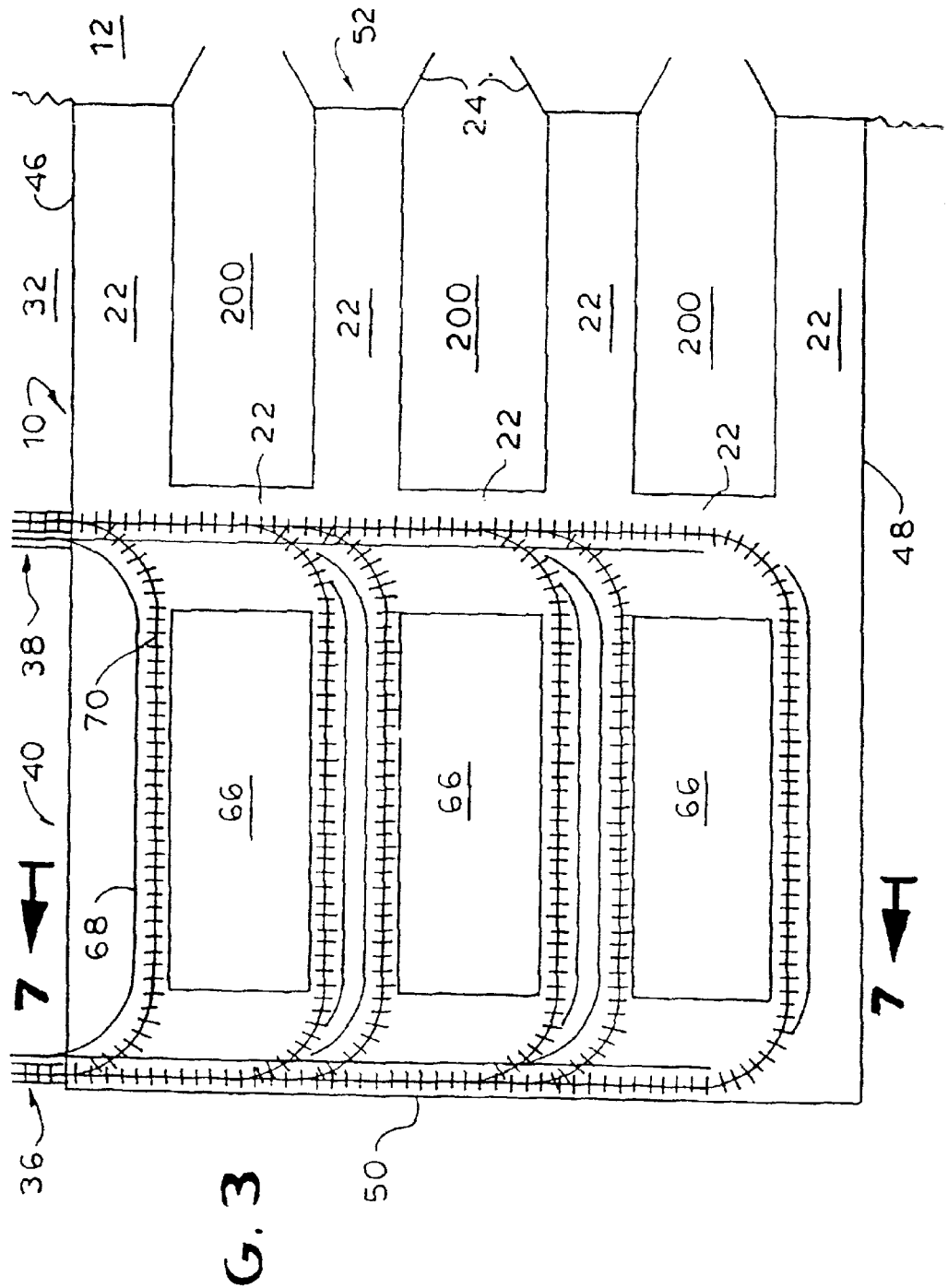
FIG. 3 is a schematic top plan view of the terminal of FIG. 1A showing the rail, truck and ship access facilities.

FIG. 3 is a schematic top view of terminal 10 at the elevated ground level of storage and transfer area 40, docks 200 and quays 22. Each dock 200 preferably has a pair of caisson doors 24 operative to close completely for drydock ship repair work by pumping out the enclosed water from dock 200. Each dock 200 can also function as a lock, as mentioned above, wherein water is pumped into the enclosed area of dock 200 to raise the level of ship 20 and decrease transfer distances between overhead transverse beam assemblies 28 and ships 20. Storage and transfer area 40 has an exemplary number of three rectangular pits 66 for container storage. Storage and transfer area 40 is accessed by flatbed trucks 112 and rail flatcars 110 (see FIG. 6) on roads 68 and tracks 70 entering through entrance 36, and leaving through exit 38. The switching operations for the train system may also be automatically controlled by the central computer system (not shown).

Figure 4A:
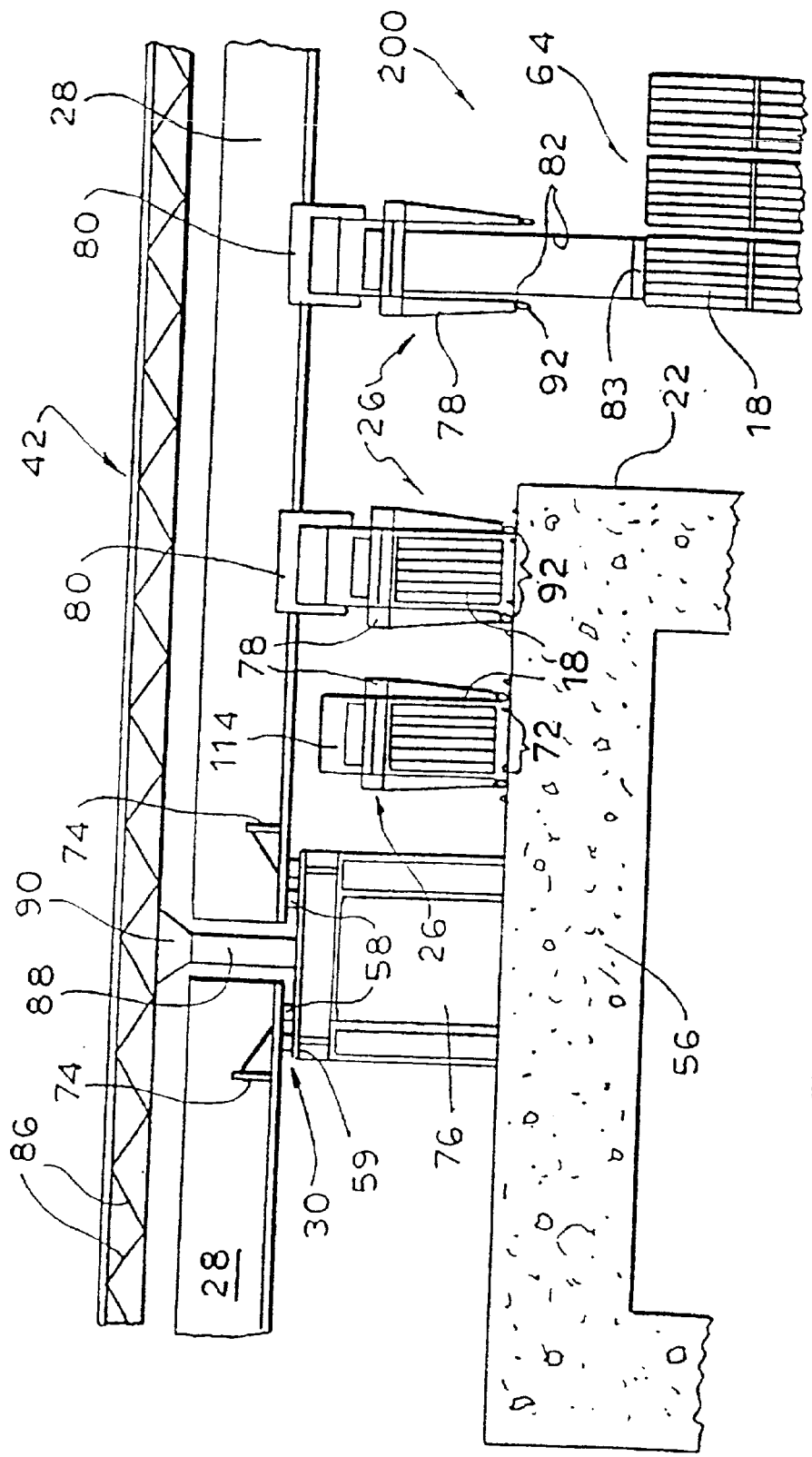
FIG. 4A is a front partial sectional elevational view of containers on a loaded ship, with containers being moved by container transport vehicles.
Figure 4B:
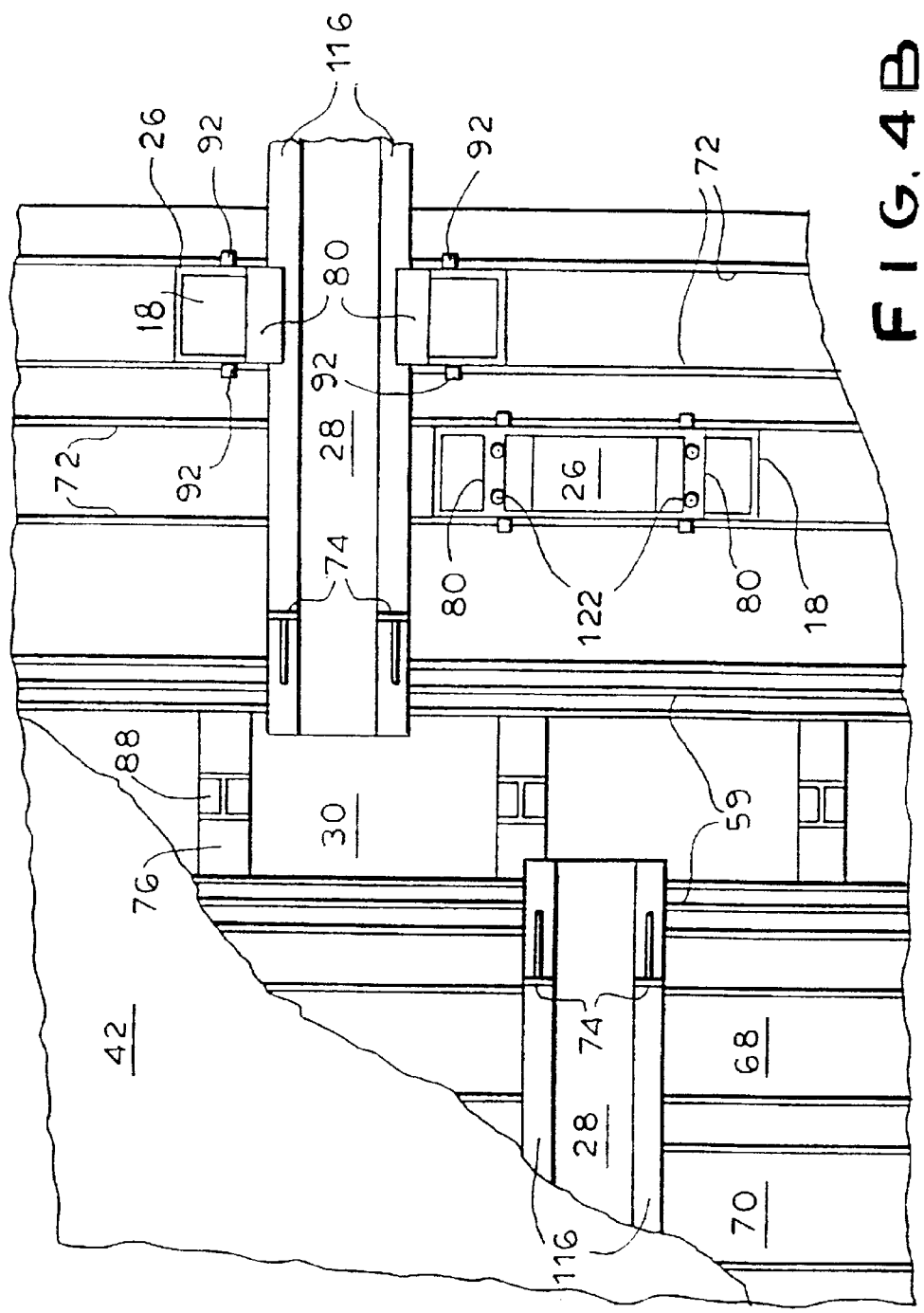
FIG. 4B is a fragmentary top view of the terminal of FIG. 1A showing the top of a quay wall with container transport vehicles on elevated ground conveyance rails and on an overhead transverse beam.

In FIGS. 4A and 4B, three container transport vehicles 26 are depicted with right container transport vehicle 26 in the process of uplifting an attached container 18 from a ship (not shown). Middle container transport vehicle 26 with container 18 is in the process of transitioning between overhead transverse beam assembly 28 and elevated ground conveyance rails 72 of quay 22, and is resting on ground wheels 92. The left container transport vehicle 26 with container 18 has been disconnected, as shown by the separation between carriage frame 114 of container transport vehicle 26 and overhead transverse beam assembly 28, and lowered from overhead transverse beam assembly 28 and is resting on elevated ground conveyance rails 72 ready to be transported to storage and transfer area 40 or to another ship 20. When container transport vehicle 26 is connected to overhead transverse beam assembly 28 by retractable wheel carriage 80, stop elements 74 located proximate to each end of each transverse beam assembly 28 prevent it from traveling beyond such stop elements 74. Container transport vehicles 26, running on electricity, are remotely controlled by the central computer system to lower spreader 83 from container transport vehicle frame 78 by cables 82 from hoist 126 (shown in FIG. 9A) for attachment and hoisting a container 18.

In FIG. 4A, roof support truss structure 86 is supported by post 88 and buttress 90 on roof support base structure 76. A pair of elevated rails 59 of longitudinal rail assembly 30 on roof support base structure 76 are located on opposite sides of post 88 for travel of overhead transverse beams 28 on motorized rollers 58 along longitudinal rail assembly 30 for alignment in positioning container transport vehicles 26 over containers 18 on a ship (not shown).

FIG. 4B is a top view of overhead transverse beam assemblies 28 which are movable by computer control on longitudinal elevated rail assemblies 30 for alignment in loading and unloading of containers 18 from ships 20. Elevated ground conveyance rails 72 conduct movement of container transport vehicles 26 on ground wheels 92 to storage and transfer area 40. Stops 74 are shown for limiting the traversal of container transport vehicles 26 on overhead transverse beam assemblies 28. Retractable wheel carriages 80 are positioned on top of each container transport vehicle 26 in a folded position, and can automatically swivel up and rotate to contact drive wheels 122 to wheel flanges 116 and ride on overhead transverse beam assembly 28.

Figure 5:
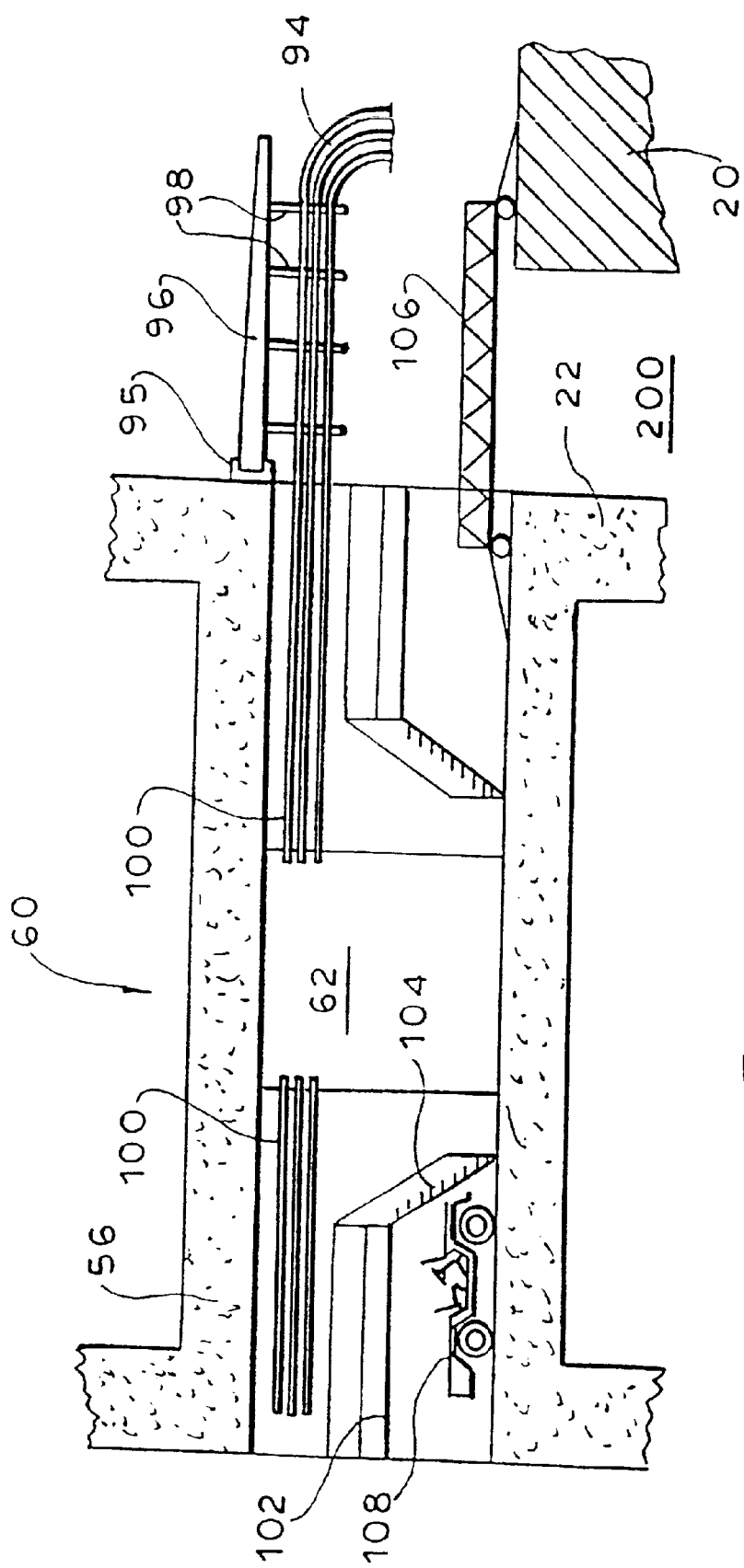
FIG. 5 is a schematic front partial cross-sectional elevational view of the service portal area of the terminal of FIG. 1A.

FIG. 5 shows a diagrammatic partial cross-section of service portal area 60 which is designed to service ship 20 with conventional shore service connections 94 such as electric power (shore power), sewage discharge, compressed air, telephone, water, fuel, and the like. Retractable service harness boom 96 with support brackets 98 for service connections 94 projects from service portal area 60 to ship 20. The flexible service connections 94 are encased in metal conduits 100 inside service portal area 60, and conduits 100 are flexible at hinge 95 of harness boom 96. Conduits 100 are accessed for maintenance by platforms 102 with stairs 104. A retractable gangway 106 provides pedestrian access to ship 20. A longitudinal access tunnel 62 is provided for electric utility carts 108 for use by the terminal personnel.

Figure 6:
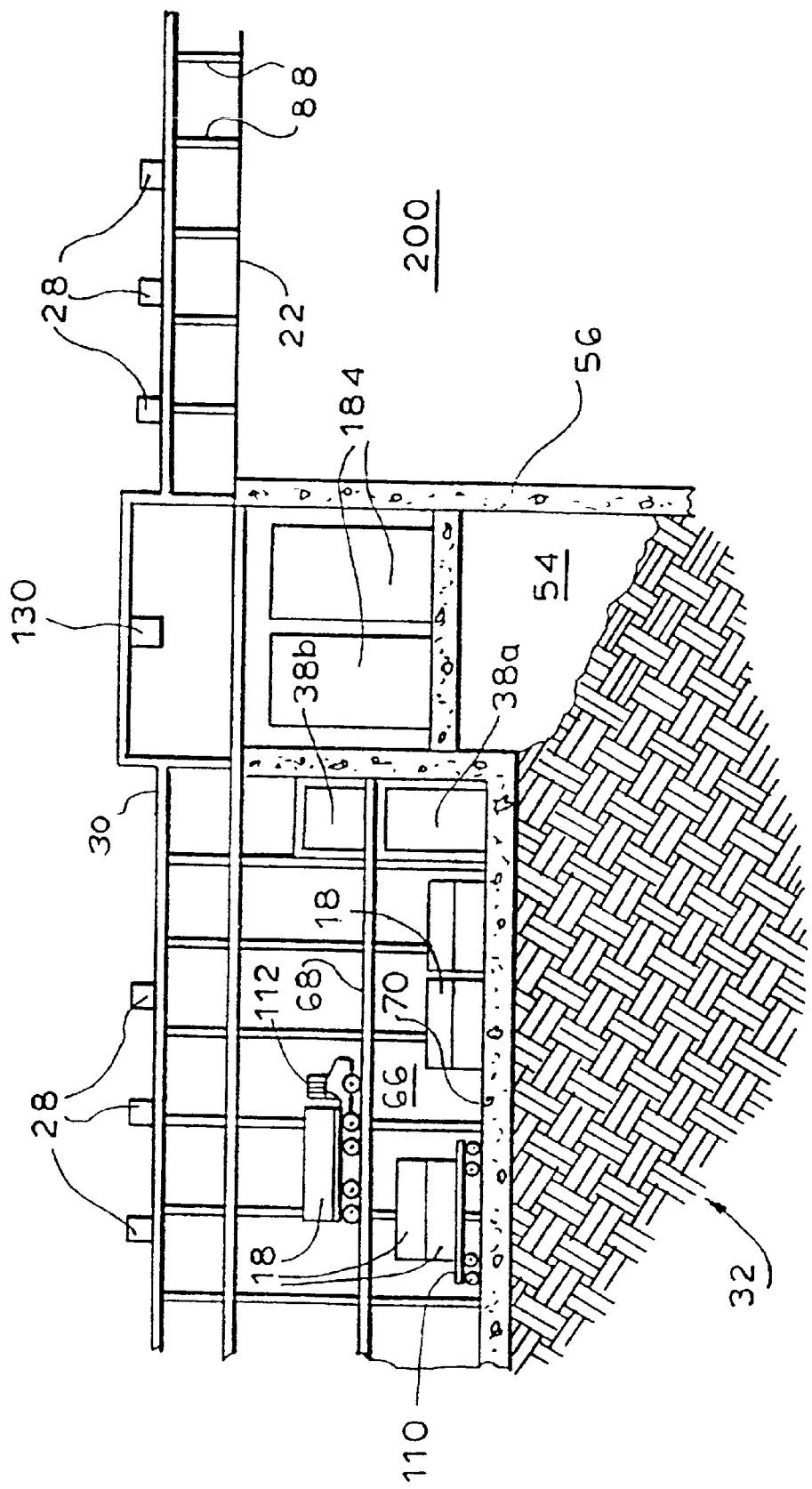
FIG. 6 is a schematic partial cross-sectional elevational view of the terminal of FIG. 1A showing the container storage area and access thereto by truck and rail.
Figure 7:
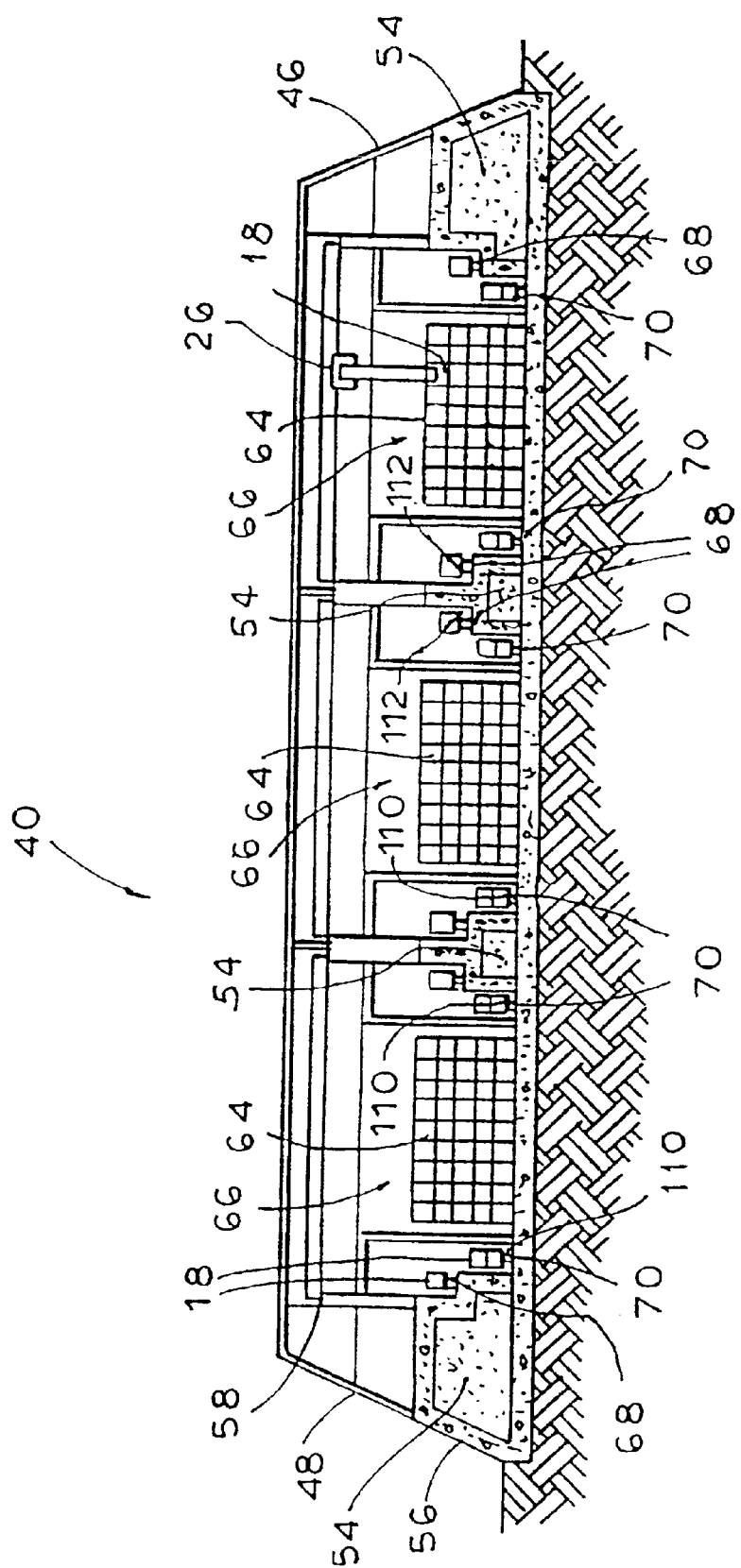
FIG. 7 is a schematic front elevational cross-sectional view of the container storage area, shown perpendicular to the view of FIG. 6, showing access thereto by truck and rail, taken along the line 7—7 in FIG. 3 and looking in the direction of the arrows.

FIG. 6 is a schematic partially cross-sectional view of a front portion of container storage pit area 66 and rear portions of quay 22 and dock 200. FIG. 6 illustrates how truck access lane 68 is elevated above train access track 70 to avoid interference between truck and railway traffic, and to facilitate double stacking of containers 18 on flatbed railcar or flatcar 110 below that of flatbed truck 112 as shown in FIG. 7. Posts 88 of steel support one of a plurality of longitudinal rails 30, which in turn supports overhead transverse beams 28. Fuel storage tanks 184 are shown located in a compartment between dock 200 and container storage pit area 66. The central computer system is capable of facilitating rolling transfers of containers 18 between container transport vehicles 26 and trucks 112 or flatcars 110. This feature eliminates the need for either vehicle to come to a complete stop before commencing the transfer of one or more containers 18, therefore saving valuable time in the transfer process.

In FIG. 7, a cross-section through the three storage pits 66 is illustrated to show elevated truck road 68 and train track 70 with respective flatbed trucks 112 and flatcars 110. On the right, container transport vehicle 26, which is attached to overhead transverse beam assembly 28, is shown lifting container 18 from stack 64.

Figure 8:
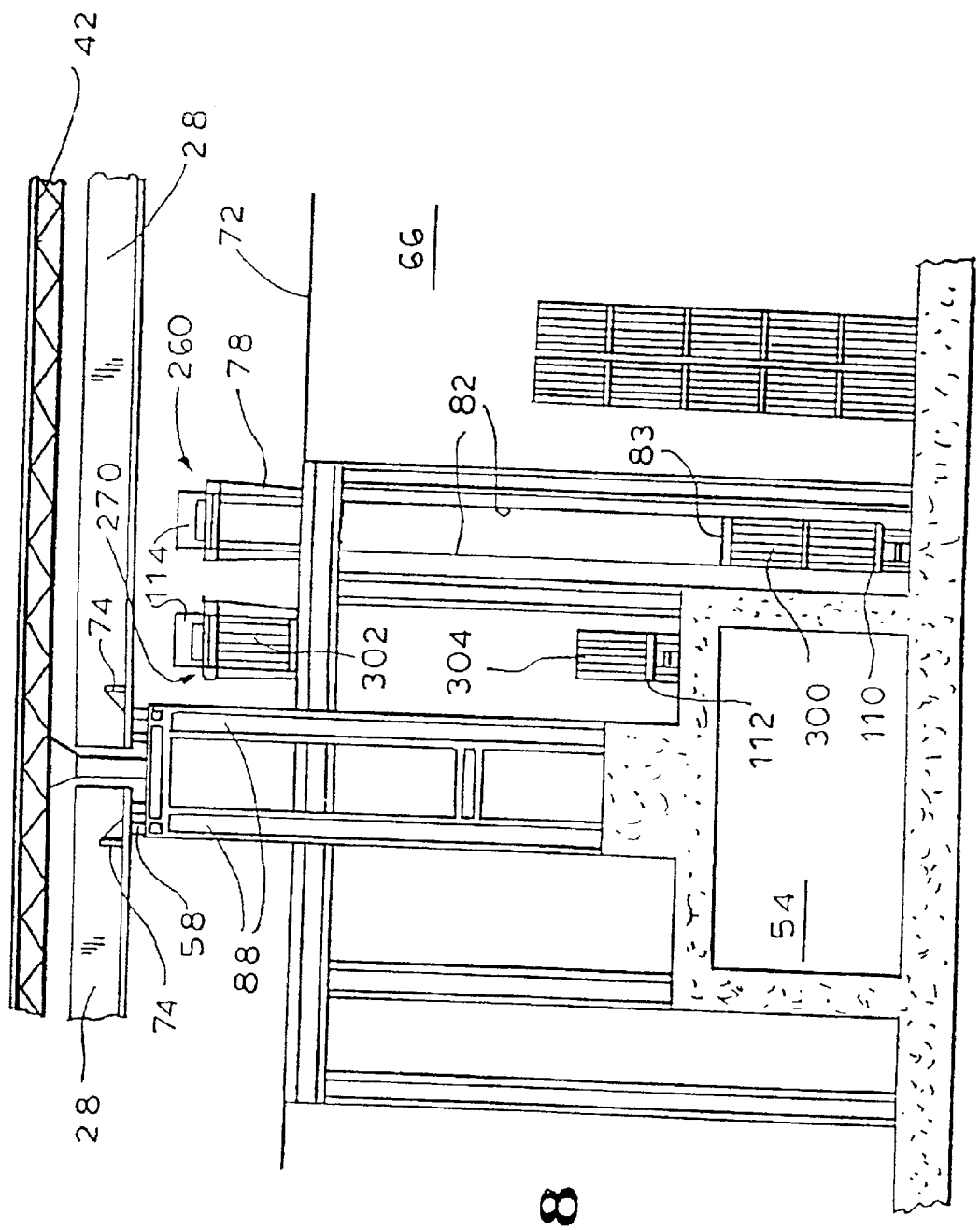
FIG. 8 is an enlarged front elevational view of one transfer area of FIG. 7.

In FIG. 8, container transport vehicle 260 is shown loading a container 300 onto a flatcar 110 using four cables 82 (2 cables hidden) passing through an open space between elevated ground conveyance rails 72 on which container transport vehicle 260 is traveling. Cables 82, which are attached to spreader 83, are lowered from container transport vehicle frame 78. Spreader 83 attaches to container 300 in four conventionally available holes located in the corners of container 18. Spreader 83 can adjust to the length of different size containers 18 (e.g., 20 feet, 40 feet or 45 feet long). Second container transport vehicle 270 has another container 302 ready to load a flatbed truck (not shown). Truck 112 underneath has already been loaded with container 304.

Figure 9B:
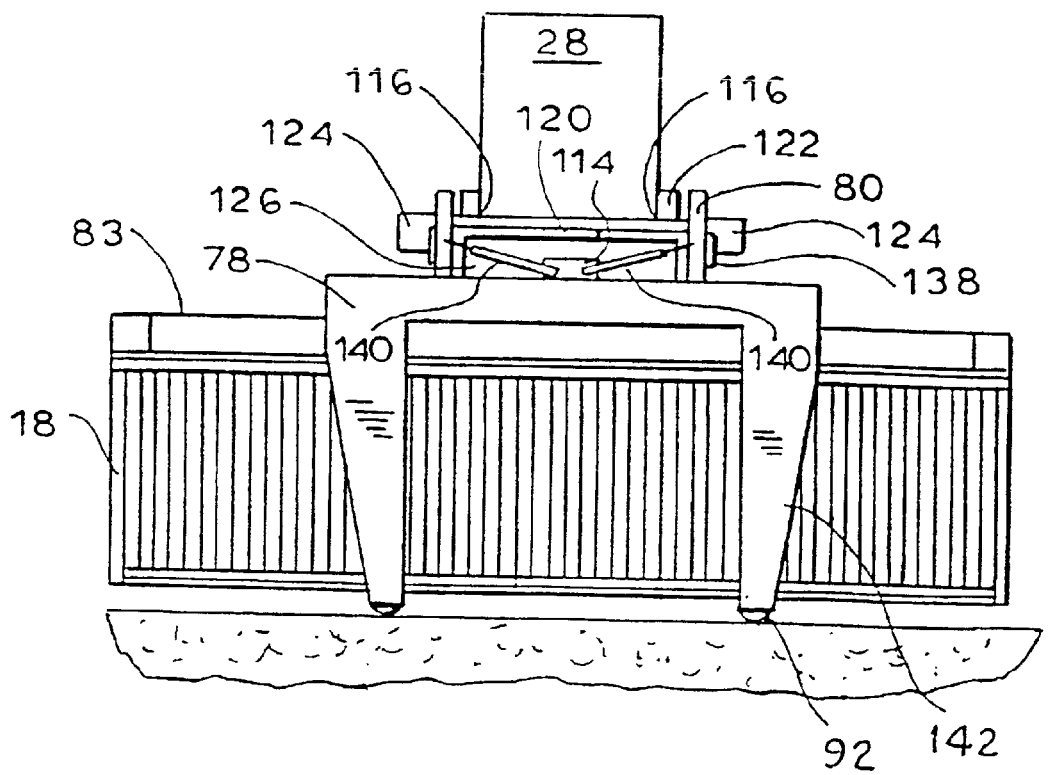
FIG. 9B is a right side elevational view of the container transport vehicle on the overhead transverse beam of FIG. 9A.
Figure 9C:
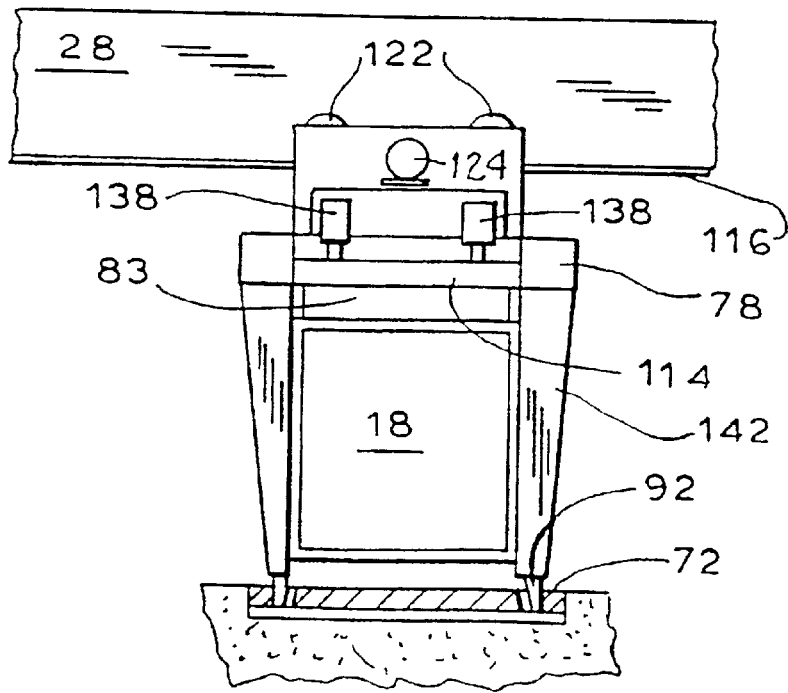
FIG. 9C is a front elevational view of the container transport vehicle on the overhead transverse beam of FIG. 9A.

The mechanisms of overhead transverse beam assembly 28 and of container transport vehicle 26 are illustrated in FIGS. 9A, 9B and 9C. FIG. 9A shows a top view of container transport vehicle 26 attached to overhead transverse beam assembly 28. Beam assembly 28 consists of a box beam with wheel flanges 116 and an electric power (3-phase) rail 120 underneath for energizing container transport vehicle 26. Preferably, four drive wheels 122 in sets of two are driven by two motors 124 through a transmission located in wheel carriage 80. Alternately, it is possible to provide drive on overhead beam 28 through an electric linear motor system (not shown) in lieu of electric rotating motors 124.

As shown in FIG. 9B, each side of container transport vehicle frame 78 has an electric wire rope hoist assembly 126. Hoist 126 in turn raises and lowers wire rope cables 82 (not shown, see FIG. 4A) which are attached to spreader frame 83, which in turn is lowered on top of container 18. Spreader frame 83 has rotatable locking pins (not shown), which enter containers 18 at sockets (not shown) located in each of the four corners thereof, and rotate to lock in. Once spreader 83 is locked onto container 18, hoist 126 is engaged to raise spreader 83 attached to container 18 until container 18 is fully drawn up into container transport vehicle 26. Lowering of container 18 and disengagement of container 18 from spreader 83 follows the reverse procedure described hereinbefore. FIG. 9B also shows retractable wheel carriage 80 with its drive wheels 122 positioned on wheel flanges 116 by operation of a pair of hydraulic rams 140 which raise and lower retractable wheel carriages 80 on command from the central computer system (not shown). Rams 140 are attached to carriage frame 114 of container transport vehicle 26.

The detachment of container transport vehicle 26 from overhead transverse beam assembly 28 begins with the extension of jack-up rams 138 (shown in FIG. 9C) to permit the ground wheels 92 of container transport vehicle 26 to rest on elevated ground conveyance rails 72. Rams 138 continue to extend until carriage frame 114 rises slightly to cause overhead drive wheels 122 to lift up off of wheel flanges 116 of overhead transverse beam assembly 28. Then rams 140 (FIG. 9B) attached to retractable wheel carriage 80 extend and rotate retractable wheel carriage 80 to a horizontal position which rotates wheels 122 away from overhead transverse beam assembly 28. Rams 138 and 140 operate from an electrically driven hydraulic power unit (not shown) located within the frame of container transport vehicle 26. With wheel carriages 80 and the drive wheels 122 now clear of overhead transverse beam assembly 28, and with container transport vehicle 26 in contact with elevated ground conveyance rails 72, jack-up rams 138 are lowered, lowering carriage frame 114. The electrical contact between container transport vehicle 26 and overhead transverse beam assembly 28 is now severed. Thus, container transport vehicle 26 with container 18 can now traverse terminal 10 on elevated ground conveyance rails 72. Preferably, a ground rail 3-phase electric power rail (not shown) contacts container transport vehicle 26 to energize the individual electric motors (not shown) within each leg 142 to propel ground wheels 92. Alternately, it is possible to provide drive on elevated ground conveyance rails 72 through an electric linear motor system (not shown) in lieu of electric rotating motors.

Figure 10C:
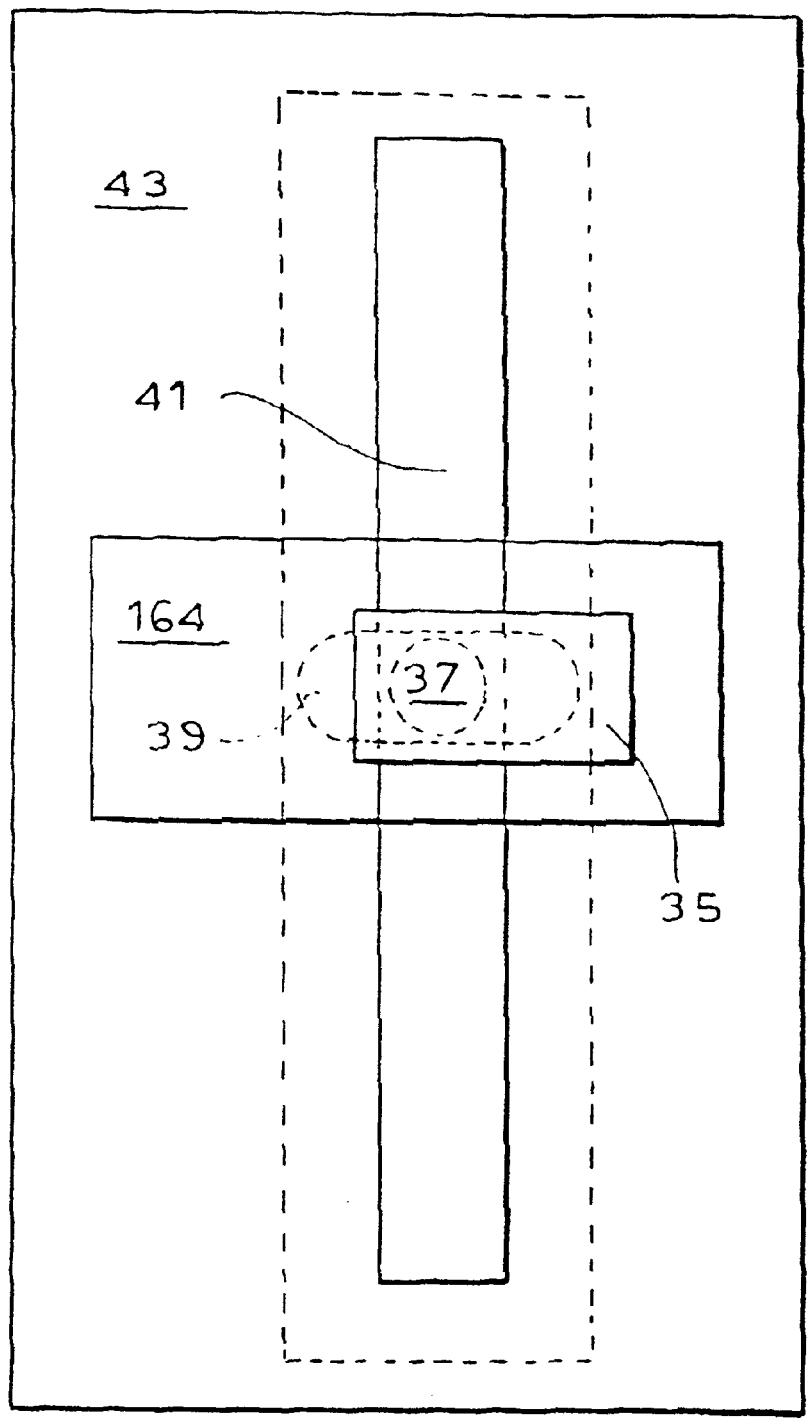
FIG. 10C is a front elevational enlarged view of a rotary actuator and key in a locked position relative to a slotted mooring fitting affixed to a side of a ship or docking module.
Figure 11:
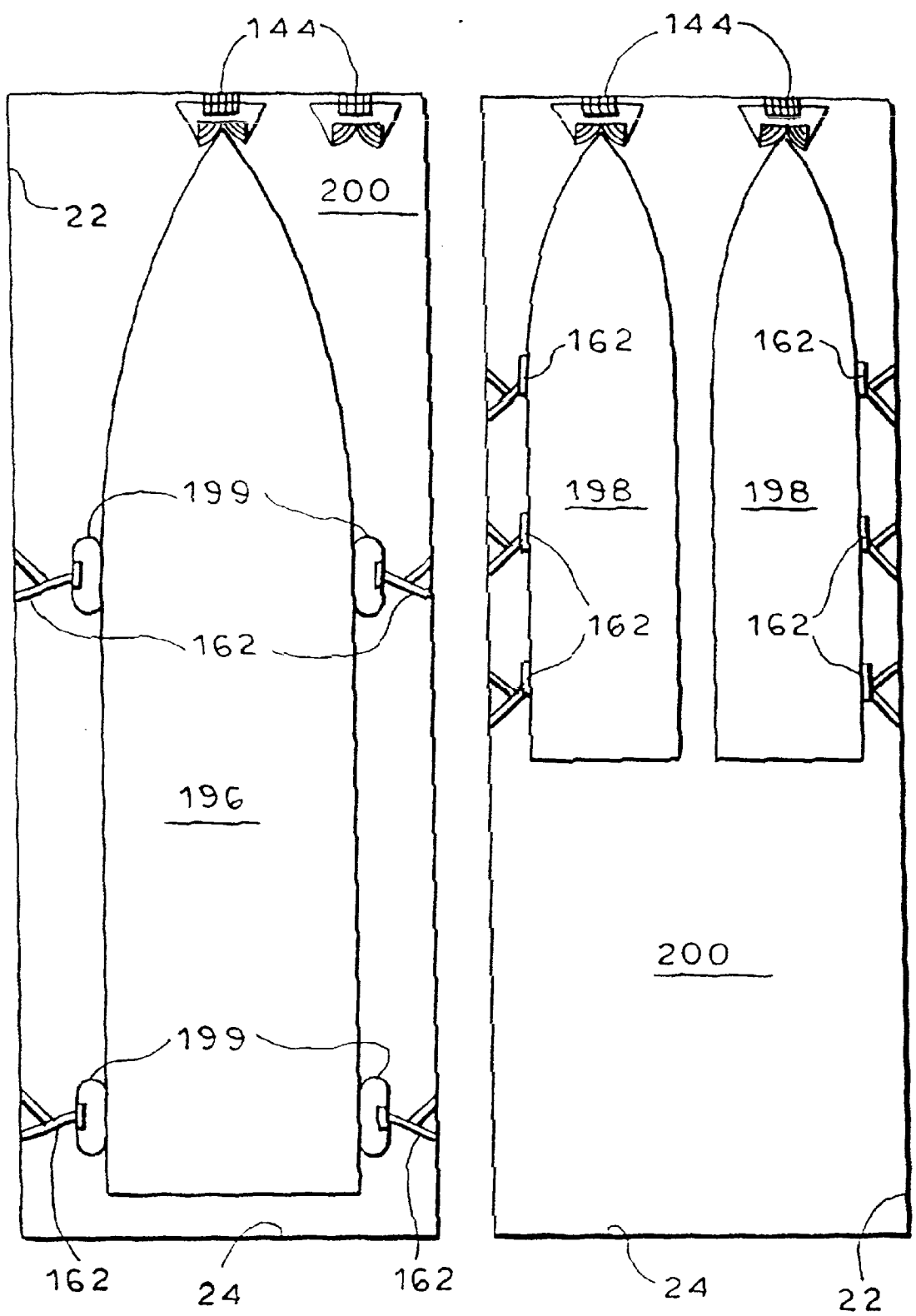
FIG. 11 is a schematic top plan view of ships in moorings with side fenders engaged.

FIG. 10A shows bow mooring assembly (bow fender) 144 and FIGS. 10B and 10C show hull side mooring assembly 162, which positions ships 20 moored in docks 200. FIG. 10A depicts bow fender 144 in plan view positioned on horizontal rail 152 (for transverse movement) between a pair of mechanical stops 154 with four hydraulic dampers 156 supporting H-shaped steel frame 158 with elastomeric bumpers 160 for accommodating the various rounded or sharp bows of ships 20 (shown in phantom). Bow fender 144 serves to position bow 150 of ship 20 transversely in dock 200, as seen in FIG. 11 for centering a large ship 196 or two small ships 198. Bow fender 144 is capable of effectively absorbing the energy imparted to it by a slow moving ship 20 during docking or while docked.

Figure 10D:
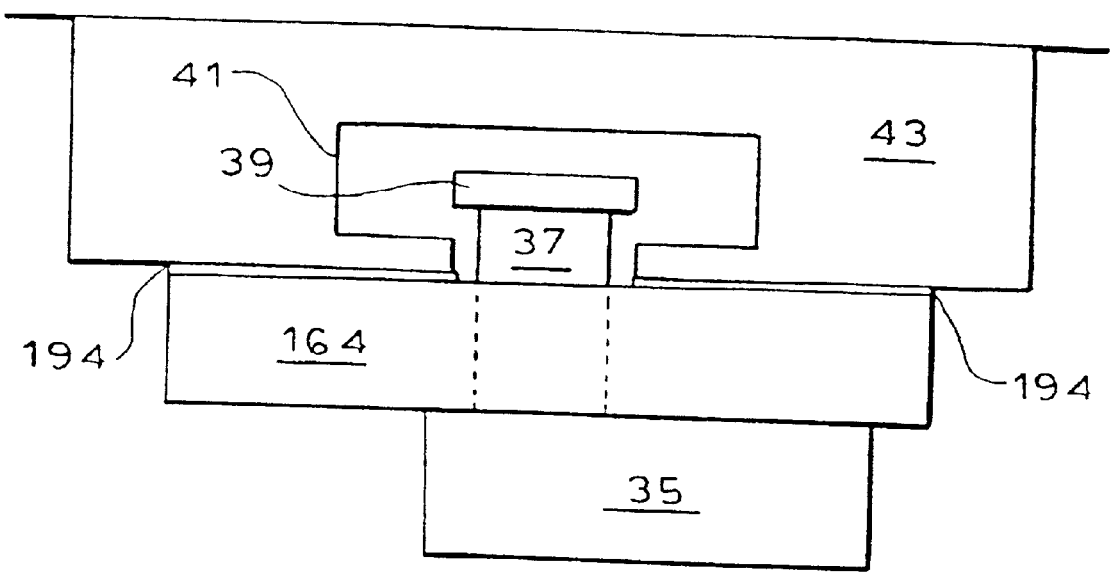
FIG. 10D is a partial sectional top plan view of the fender of FIG. 10B showing the key in the unlocked position.

FIGS. 10B, 10C and 10D illustrate locking fender device 162 which positions ships 20 moored in docks 200. Locking fender device 162 can conform to virtually any contour of the side of ship 20 or docking module 199 (see FIG. 11). In FIG. 10B, rectangular fender element 164 with elastomeric pads 194 is supported by fender carriage 168 that travels horizontally on two pairs of wheels 163 in horizontal track 165 within the sidewall of quay 22. Extender arm 170 with groove 172 on its upper surface is pivotally hinged between fender element 164 and fender carriage 168. An extender ram 174 with one end pivoting from the fender carriage 168 and its opposite end having pin 176 riding in groove 172 of extender arm 170, is motivated by hydraulic power unit 178 housed in fender carriage 168 to automatically adapt with appropriate damping to the inclination of the surface of moored ship 20 or the outboard side of docking module 199 (FIG. 11). Third adjustment arm 180 is preferably positioned parallel to extender arm 170 and pivotally hinged between fender element 164 and fender carriage 168.

Provision is made for locking fender device 162 to the hull of ship 20 via slotted rectangular mooring fitting 43 which is integral to the hull of ship 20 or docking module 199 (FIG. 11). Fender device 162 engages mooring fitting 43 in such a way as to restrain horizontal movement of ship 20 within dock 200, yet permit vertical movement of ship 20 with changes in the draft and water level within the dock 200. This method of horizontal restraint facilitates the necessary alignment between container transport vehicles 26 on the overhead transverse beams 28 and containers 18 on ship 20. Vertical keyway 41 along the longitudinal axis of mooring fitting 43 permits the operation of oblong-shaped locking key element 39 on the end of key shaft 37, which is rotated in either direction by electric rotary actuator 35. Locking key element 39 is integrated and centered in fixed rectangular fender element 164.

FIG. 10C is a front elevational view of electric rotary actuator 35, key shaft 37 and key element 39 in a locked position in mooring fitting 43 affixed to a side of ship 20 or docking module 199 (FIG. 11).

FIG. 10D is a cross-sectional plan view of key element 39 shown rotated to an open position by rotating electric rotary actuator 35, enabling the release of fender element 164 from mooring fitting 43.

FIG. 11 illustrates the versatility of bow fender assemblies 144 and fender devices 162 in mooring different sized ships 20 in docks 200. A single large ship 196 is moored in left dock 200 with horizontal adjustment of fender devices 162. Two smaller ships 198 are berthed together in right dock 200 with appropriate positioning of fender devices 162. FIG. 11 also illustrates docking modules 199 that may be used to maneuver ship 196 into and out of dock 200.

Figure 12B:
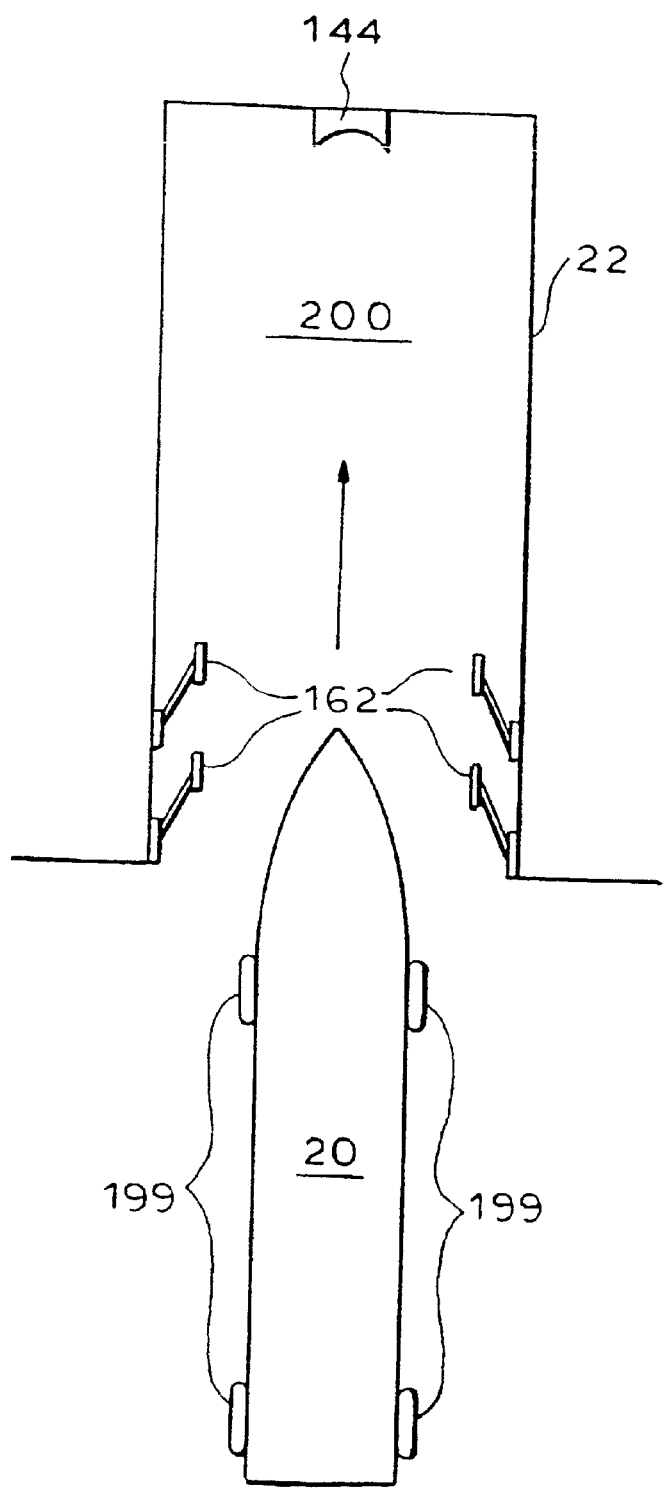

FIGS. 12A, 12B, 12C, and 12D illustrate the sequence of events required for docking ship 20. In FIG. 12A, four docking modules 199, which are small, motorized and remotely controlled vehicles, are dispatched to incoming ship 20. A guidance system controlled by the central system of terminal 10 sends commands to each docking module 199 to control the magnitude and the direction of thrust of each docking module 199 to guide modules 199 toward ship 20.

In FIG. 12B, modules 199 are secured to the hull of ship 20 in a manner similar to that utilized by fender devices 162 and steer ship 20 into dock 200.

Figure 12C:
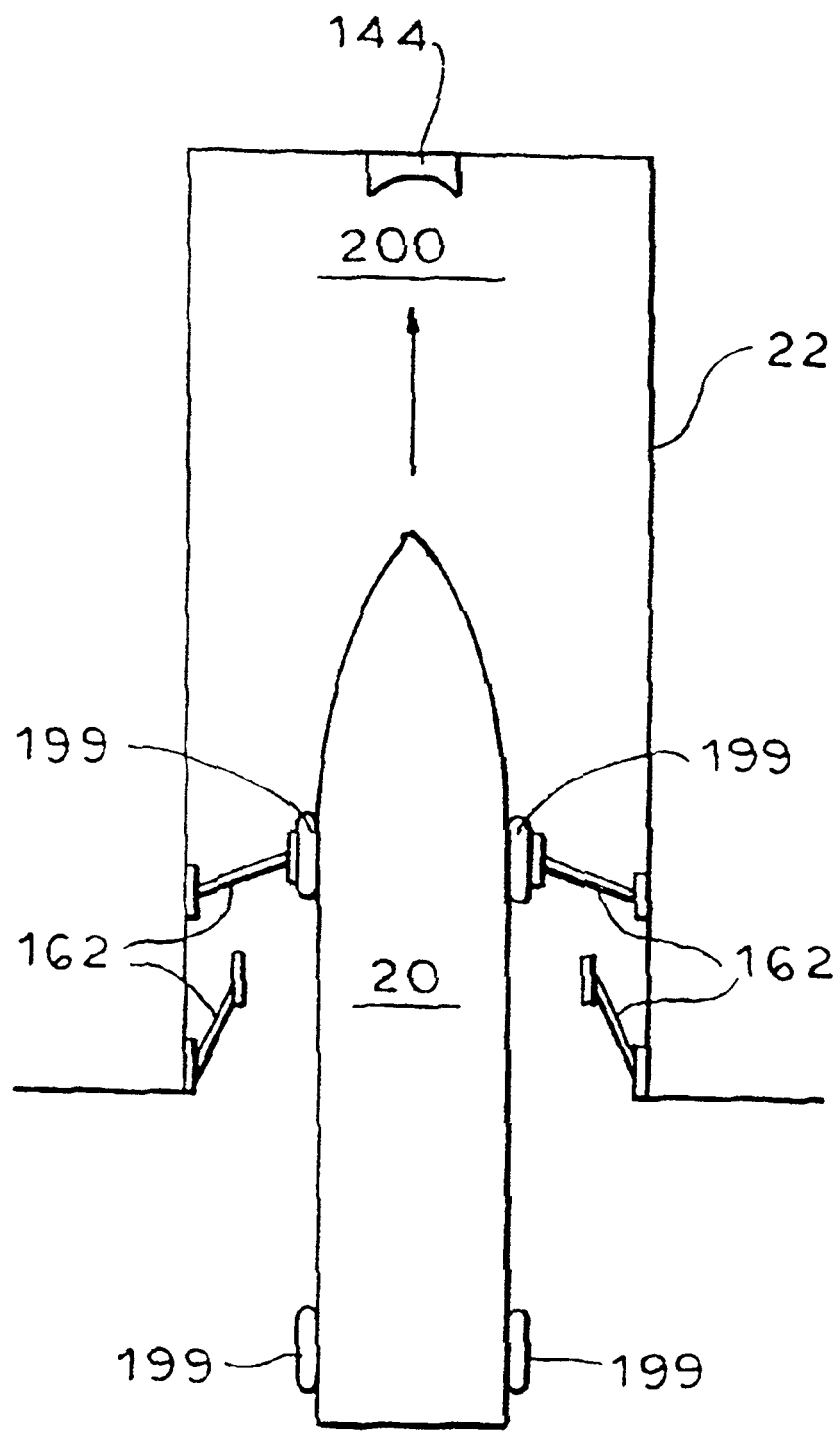

In FIG. 12C, as ship 20 enters dock 200, fender devices 162 extend under the control of the central computer system to engage the outboard side of each docking module 199, thus establishing the line of the entrance of ship 20 into dock 200. Fender devices 162 in turn ride in horizontal tracks 165 in the quay wall, thus permitting ship 20 to enter dock 200 without the danger of contacting the sidewalls of quay 22.

Figure 12D:
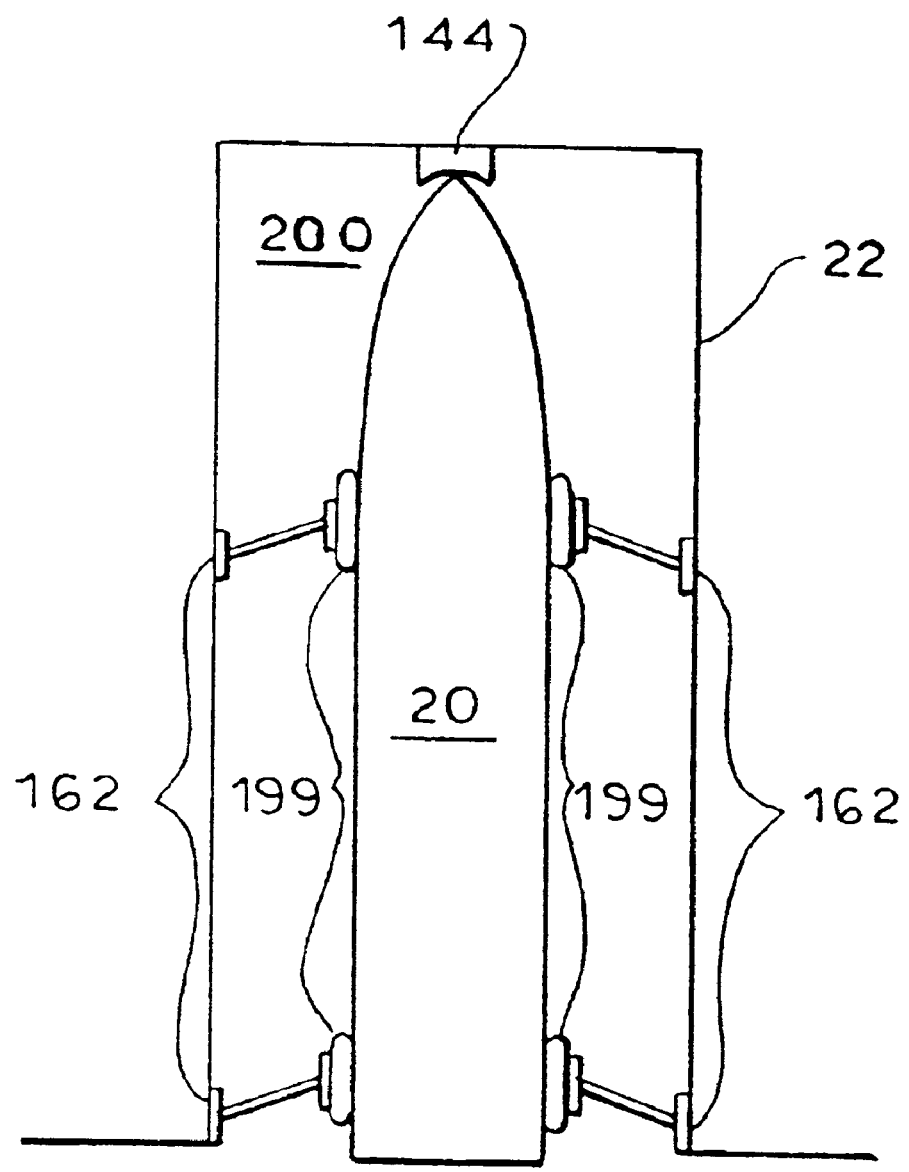

Once ship 20 reaches its final position in dock 200 as shown in FIG. 12D, docking modules 199 are deactivated, and cooperate with fender devices 162 to keep ship 20 moored in dock 200.

Provision is made for manual control of docking modules 199 from the bridge (control room) of incoming ship 20, via a special control connection made between docking module 199 and ship 20 when docking module 199 attaches to the hull of ship 20. Each docking module 199 can also be manually controlled from a local control station abroad docking module 199 itself. During operation of dock 200 as a graving dock, docking modules 199 can be removed from their position between fender devices 162 and ship 20, and ship 20 is thus moored directly with fender devices 162. In this scenario, docking modules 199 are reattached to ship 20 once ship 20 is refloated. Use of docking modules 199 is unique in that they preclude the need for conventional tugboats, and also serve as a part of the mooring/fender apparatus.

Smaller, more maneuverable, ships entering and leaving dock 200 may not require the use of docking modules 199, and thus these ships can be moored exclusively with fender devices 162, as seen in the right dock 200 in FIG. 11.

Figure 13:
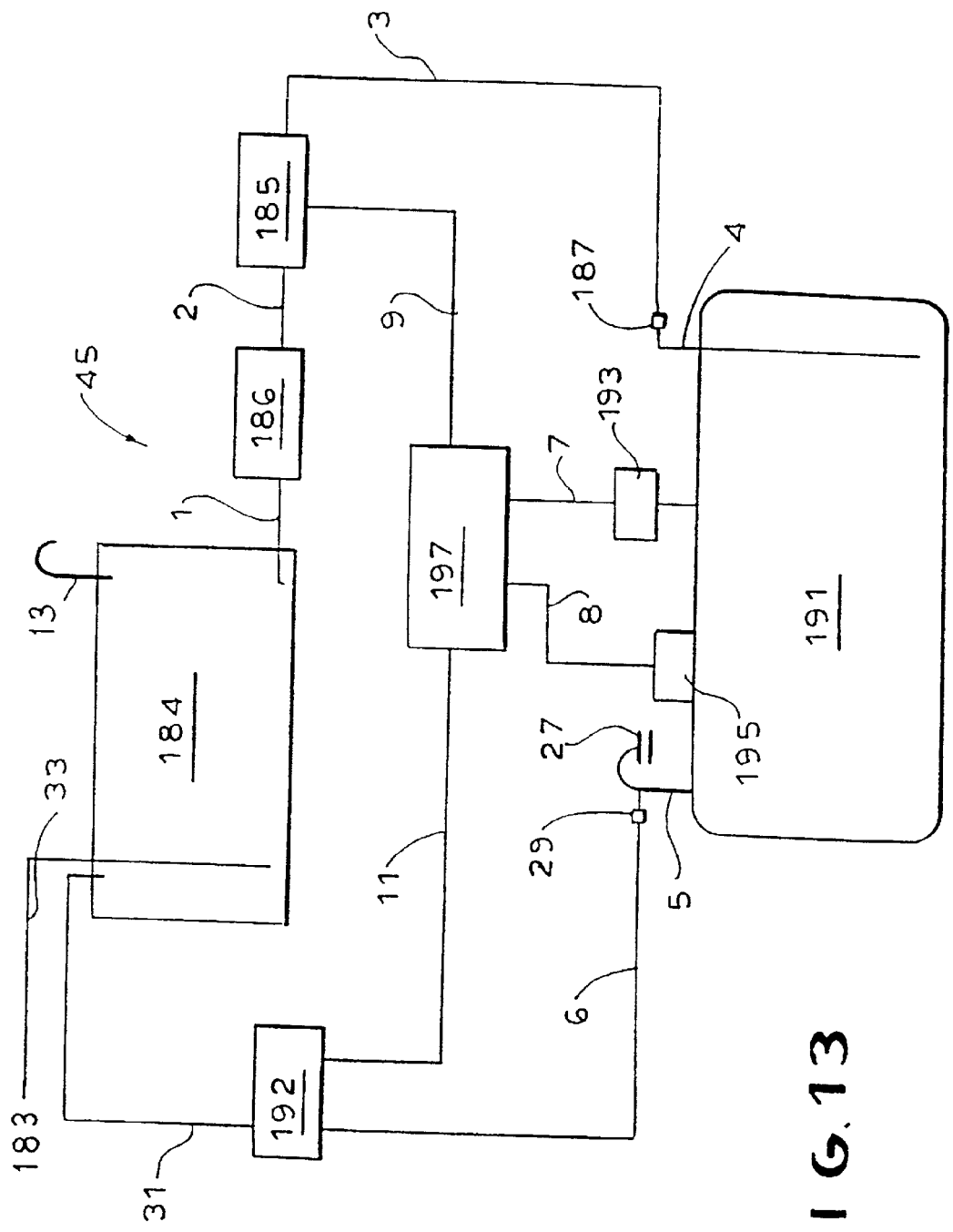
FIG. 13 is a schematic diagram of a system used to rapidly refuel or bunker ships.

FIG. 13 is a diagram of a high flow rate fueling system 45 designed to rapidly fuel (or bunker) ships utilizing terminal 10 of the present invention. Fueling system 45 precludes the need for outside fueling barges to be brought into terminal 10 to refuel ships 20. Fuel 183 from a land based source is supplied through pipe 33 to storage tanks 184 located within quays 22 of terminal 10 of the present invention. Fuel 183 is pumped from storage tanks 184 with vent pipe 13, to ship 20 through pipes 1 and 2 via the filtration unit 186 and a pumping unit 185, respectively to remove any impurities in fuel 183. Fuel 183 is pumped through pipe 3 to fueling station 187 of ship 20, where fuel 183 is routed to pipe 4 connected to fuel storage tank 191 of ship 20. In order to maximize the pumping rate, vapor evacuation unit 192 is used to draw the fuel vapor and air composition from the top of fuel storage tank 191, and to maintain atmospheric pressure in tank 191 as fuel 183 is pumped in. Excessive vapors are recycled to storage tanks 184 by pipe 31. By maintaining atmospheric pressure in tank 191 through pipes 5 and 6 as it fills with the tank vent 27 closed, excessive structural damaging pressures are prevented in the tank. Quick connection 29 is conveniently provided in pipe 6. Elimination of back pressures permits higher pumping rates than used conventionally, and therefore results advantageously in less time to fill the tanks 191 of ship 20 with fuel. The pumping rate is dependent on the capacity of pumping unit 185 and not the structural integrity of tank 191 or its ability to withstand the higher back pressures associated with high pumping rates. The pumping rate is controlled via combined feedback of pressure sensor 193 by electrical line 7 and tank level indicator 195 by electrical line 8. Both of these devices provide signals to pumping control unit 197, which is programmed to set and adjust the speeds of pumping unit 185 by electrical line 9 and vapor evacuation unit 192 by electrical line 11 to maximize the rate at which fuel is safely pumped aboard ship 20. Tank level indicator 195 signals pumping control unit 197 with respect to the actual level of fuel in tank 191. Pressure sensor 193 provides pumping control unit 197 with the actual pressure in tank 191. Pumping control unit 197 in turn adjusts the speed of vapor evacuation unit 192 to maintain tank 191 at atmospheric pressure. As long as atmospheric pressure is maintained, pumping control unit 197 signals pumping unit 185 to pump at a maximum rate.

FIG. 14 depicts as a second embodiment of the present invention an alternative site location for terminal 10 in a navigable waterway 12 such as a bay or harbor, completely surrounded by water, with truck and rail access to the terminal from land 32 via the rail and truck causeway 15 on supports 21.

FIG. 15 depicts as a third embodiment of the present invention another alternative means of connecting terminal 10 to land 32 by employing a rail and truck tunnel 17 to the terminal to container chutes 19 where container transport vehicles (not shown) can load and unload cargo containers.

Industrial Applicability

Thus, container transfer terminal 10, with an integrated and automated central computerized system incorporating container transport vehicles 26 traveling on overhead transverse beam assemblies 28 and elevated ground conveyance rails 72, has been disclosed for the loading and unloading of cargo containers 18 from container ships 20 with a minimum of time and effort. Containers 18 can subsequently be temporarily stored in the rear portion of terminal 10 or immediately loaded onto either train flatcars 110, flatbed trucks 112, or another ship 20 utilizing container transport vehicles 26 and resulting in maximum efficiency, and minimizing storage and loading time. It should be noted that this system can be applied to transferring cargo directly from one ship to another. Terminal 10 can be constructed in or adjacent to any waterway 12 and can handle year-round operation.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A terminal system for unloading containers from and loading containers onto container ships, comprising:
   A. a terminal structure having an interconnected right side, left side and rear side, and a substantially open front side with at least two side-by-side quays adapted to each form at least one dock, said dock including a wall on at least two facing sides thereof, each of said docks adapted to receive at least one container ship;
   B. a plurality of elevated ground conveyance rails positioned atop at least one of said walls;
   C. longitudinal conveyance rails positioned above each of said walls;
   D. a plurality of generally transverse overhead conveyance beams constructed and adapted to be positioned substantially perpendicularly between said longitudinal conveyance rails and positioned over at least one of said container ships in each of said docks; and
   E. at least one container transport vehicle constructed and adapted to be capable of traveling along said elevated ground conveyance rails and said generally transverse overhead conveyance beams and adapted to pick up, carry and deposit a container between a container ship berthed in said dock and a location other than the container ship.

2. The terminal system of claim 1, further comprising a computer control system for controlling the operations of each of said at least one container transport vehicles.

3. The terminal system of claim 1, including a plurality of quays which are adapted to form a plurality of docks, and further comprising at least one interquay transfer beam for conveying said at least one container transport vehicle between said plurality of docks.

4. The terminal system of claim 1, whereby said at least one container transport vehicle does not change the orientation of the container being picked up, carried or deposited.

5. The terminal system of claim 1, wherein said terminal structure further comprises a storage area adjacent to each of a plurality of docks, and whereby said terminal can transfer containers between one ship berthed in one dock and another ship berthed in another dock or said storage area by utilizing said transverse overhead conveyance beams, said elevated ground conveyance rails, and said container transport vehicles, under computerized control.

6. A terminal system according to claim 1, wherein each of said at least one docks has the capability of acting as a wet dock, a graving dock and a lock.

7. A terminal system according to claim 1, wherein said walls consist of dredged material covered by a concrete wall.

8. A terminal system according to claim 1, further comprising remotely controlled docking modules for moving ships in or out of one of said docks.

9. A terminal system according to claim 1, wherein said terminal structure is enclosed to accommodate all-weather, year-round operation and further comprising:
  a roof on said terminal structure;
  means for removing ship stack emissions from within said terminal structure;
  service portals separate from cargo handling areas of said terminal which provide access to ships berthed in said docks;
  bow and side fender mooring devices adaptable to the form of a ship's hull;
  service harnesses which provide fast shore service connections to ships berthed in said docks;
  caisson doors attached to at least one of said docks which open and close, and when closed isolate said dock from the adjoining waterway to allow dewatering of said dock for drydocking a ship or to permit water to be pumped into said dock acting as a lock to raise the position of a ship within said dock; and
  a high flow rate fueling system for a ship berthed in one of said docks comprising storage tanks and means for high-speed pumping of fuel.

10. The terminal system of claim 1, wherein said terminal structure further comprises a storage and transfer area, adjacent to a dock, containing railroad tracks, and whereby said terminal can transfer containers between one ship berthed in one dock and another ship berthed in another dock, a railroad car on said railroad tracks or a storage area within said storage and transfer area by utilizing said transverse overhead conveyance beams, said elevated ground conveyance rails, and said container transport vehicles under computerized control.

11. The terminal system of claim 10, further comprising a railroad access to said terminal structure for connection to said railroad tracks in said storage and transfer area.

12. A terminal system according to claim 11, wherein said railroad access is connected by a tunnel under water to container chutes located in said terminal structure.

13. A terminal system according to claim 11, wherein said railroad access is connected by a causeway on supports to said terminal structure.

14. The terminal system of claim 1, wherein said terminal structure further comprises a storage and transfer area, adjacent to a dock, containing a roadway, and whereby said terminal can transfer containers between one ship berthed in one dock and another ship berthed in another dock, a truck on said roadway or a storage area within said storage and transfer area, by utilizing said transverse overhead conveyance beams, said elevated ground conveyance rails, and said container transport vehicles under computerized control.

15. The terminal system of claim 14, further comprising a truck access to said terminal structure for connection to said roadway in said storage and transfer area.

16. A terminal system according to claim 15, wherein said truck access is connected by a tunnel under water to container chutes located in said terminal structure.

17. A terminal system according to claim 15, wherein said truck access is connected by a causeway on supports to said terminal structure.

18. The terminal system of claim 1, wherein said terminal structure further comprises a storage and transfer area, adjacent to a dock, containing railroad tracks and a roadway, and whereby said terminal can transfer containers among one ship berthed in one dock, another ship berthed in another dock, a railroad car on said railroad tracks, a truck on said roadway, or a storage area within said storage and transfer area, by utilizing said transverse overhead conveyance beams, said elevated ground conveyance rails, and said container transport vehicles under computerized control.

19. The terminal system of claim 18, further comprising a railroad access and a truck access to said terminal structure for connection to said railroad tracks and roadway in said storage and transfer area.

20. A terminal system according to claim 19, wherein said railroad access and said truck access are connected by a tunnel under water to container chutes located in said terminal structure.

21. A terminal system according to claim 19, wherein said railroad access and said truck access are connected by a causeway on supports to said terminal structure.

* * * * *